Figure 1:
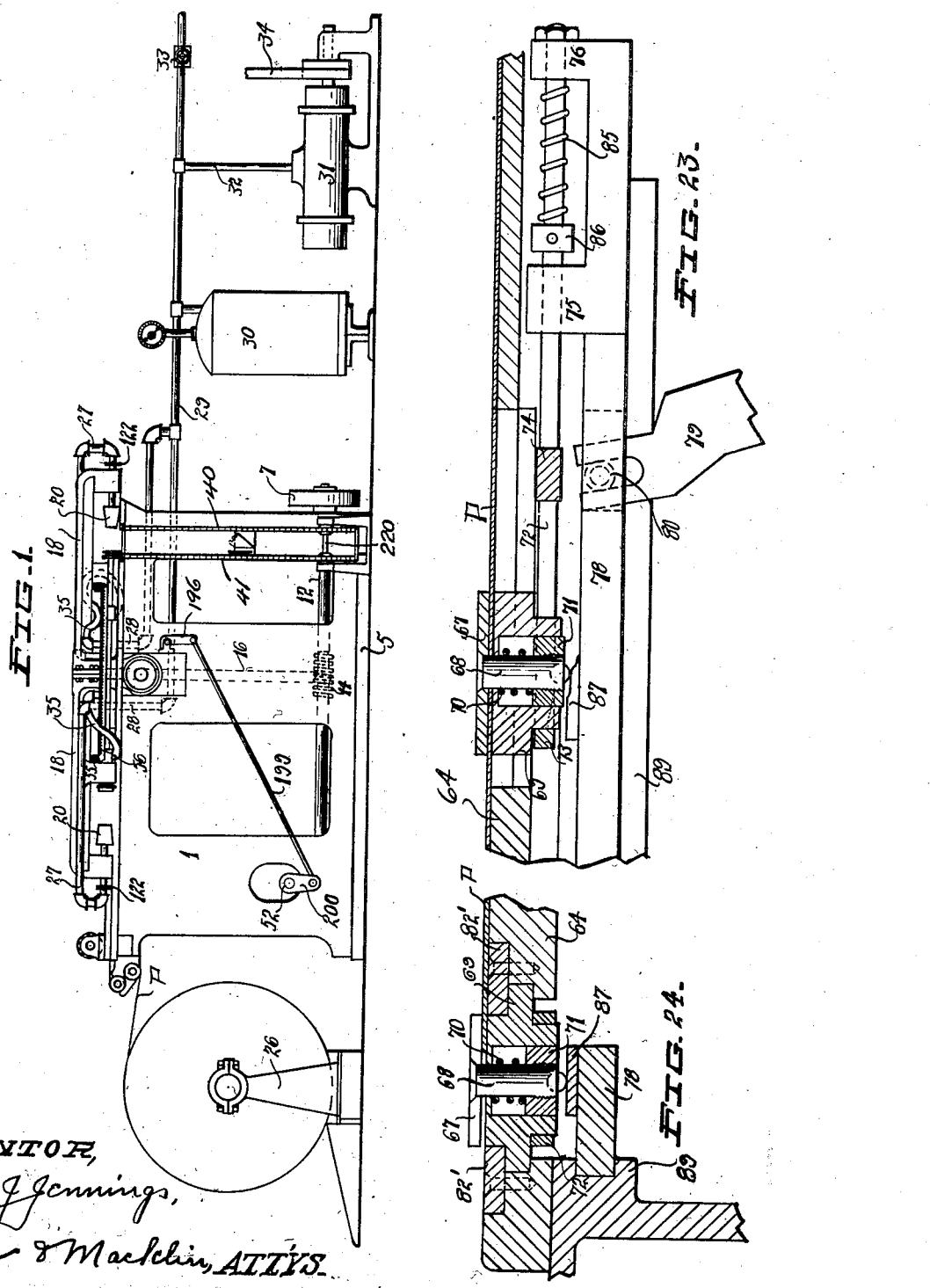

Dec. 9, 1924.

D. J. JENNINGS 1,518,514

MACHINE FOR THE MANUFACTURE OF PAPER RECEPTACLES

Filed Feb. 23, 1923    13 Sheets-Sheet 1

INVENTOR,
David J. Jennings,
BY
Bates & Macklin, ATTYS.

Dec. 9, 1924. 1,518,514
D. J. JENNINGS
MACHINE FOR THE MANUFACTURE OF PAPER RECEPTACLES
Filed Feb. 23, 1923 13 Sheets-Sheet 3

Dec. 9, 1924.

D. J. JENNINGS 1,518,514

MACHINE FOR THE MANUFACTURE OF PAPER RECEPTACLES

Filed Feb. 23, 1923 13 Sheets-Sheet 5

INVENTOR,
David J. Jennings,
BY Bates & Macklin,
ATTYS.

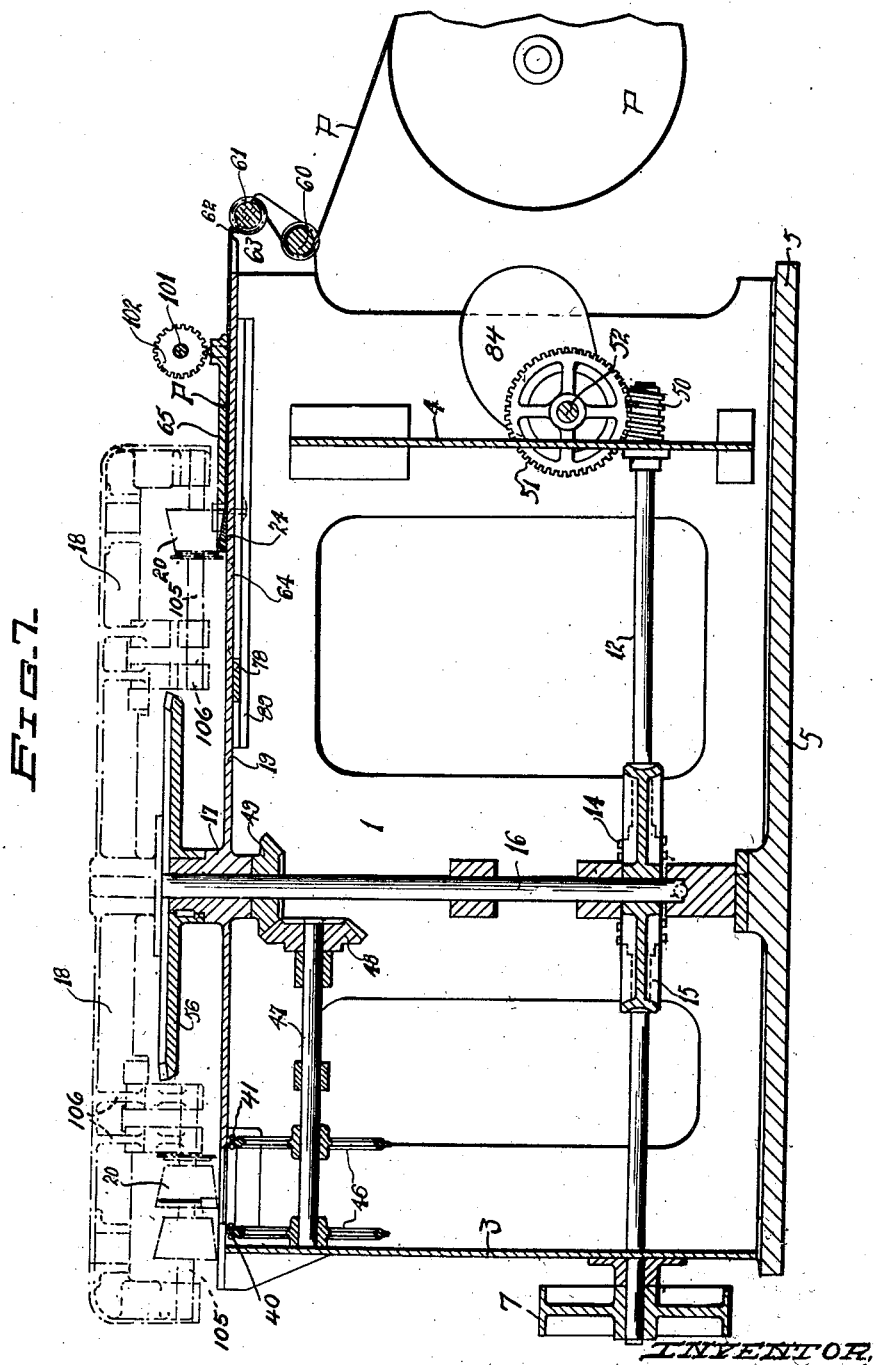

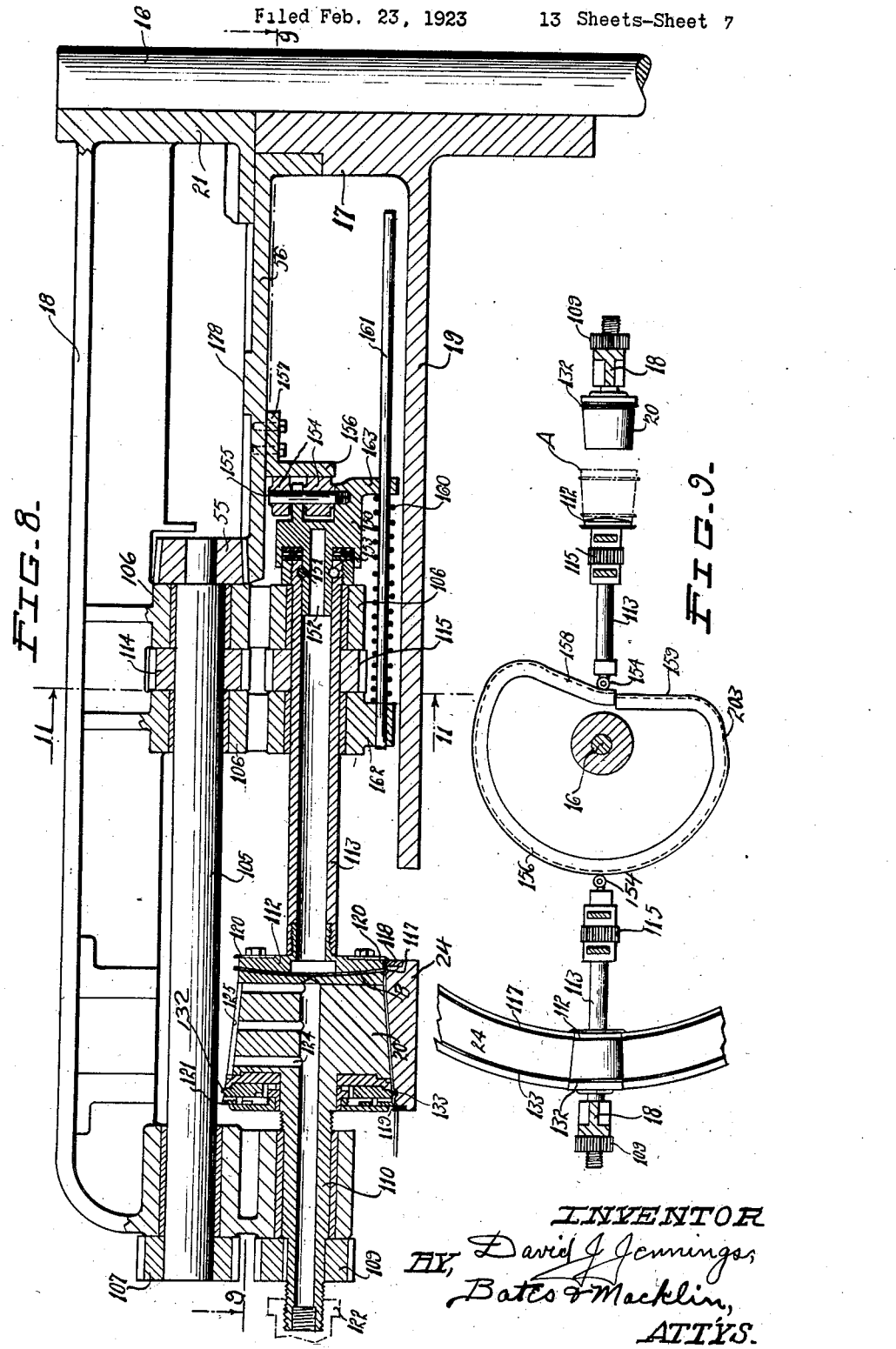

Dec. 9, 1924.  
D. J. JENNINGS  
1,518,514  
MACHINE FOR THE MANUFACTURE OF PAPER RECEPTACLES  
Filed Feb. 23, 1923  
3 Sheets-Sheet 8
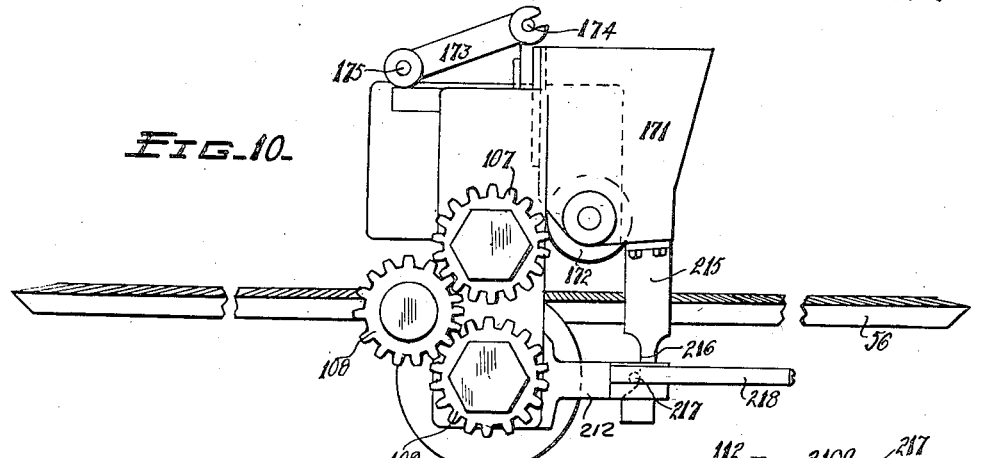
FIG. 10.
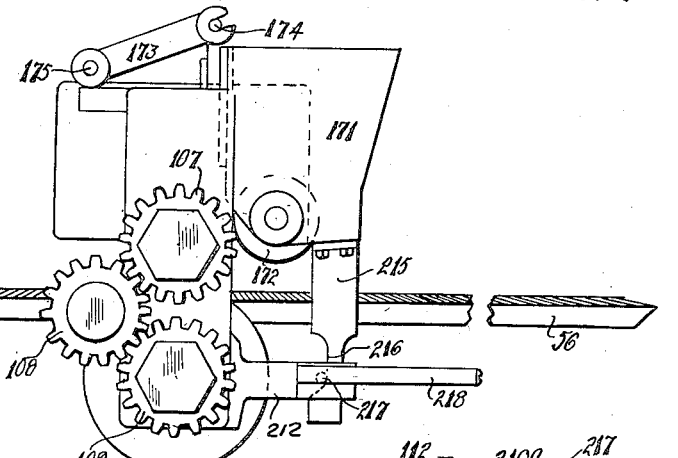
FIG. 11.
FIG. 13.
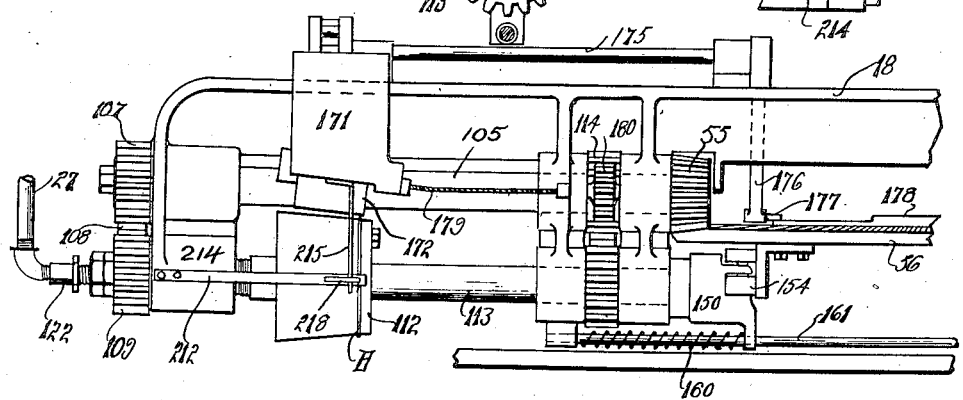
FIG. 12.
INVENTOR,
David J. Jennings,
BY Bates & Macklin,
ATTYS

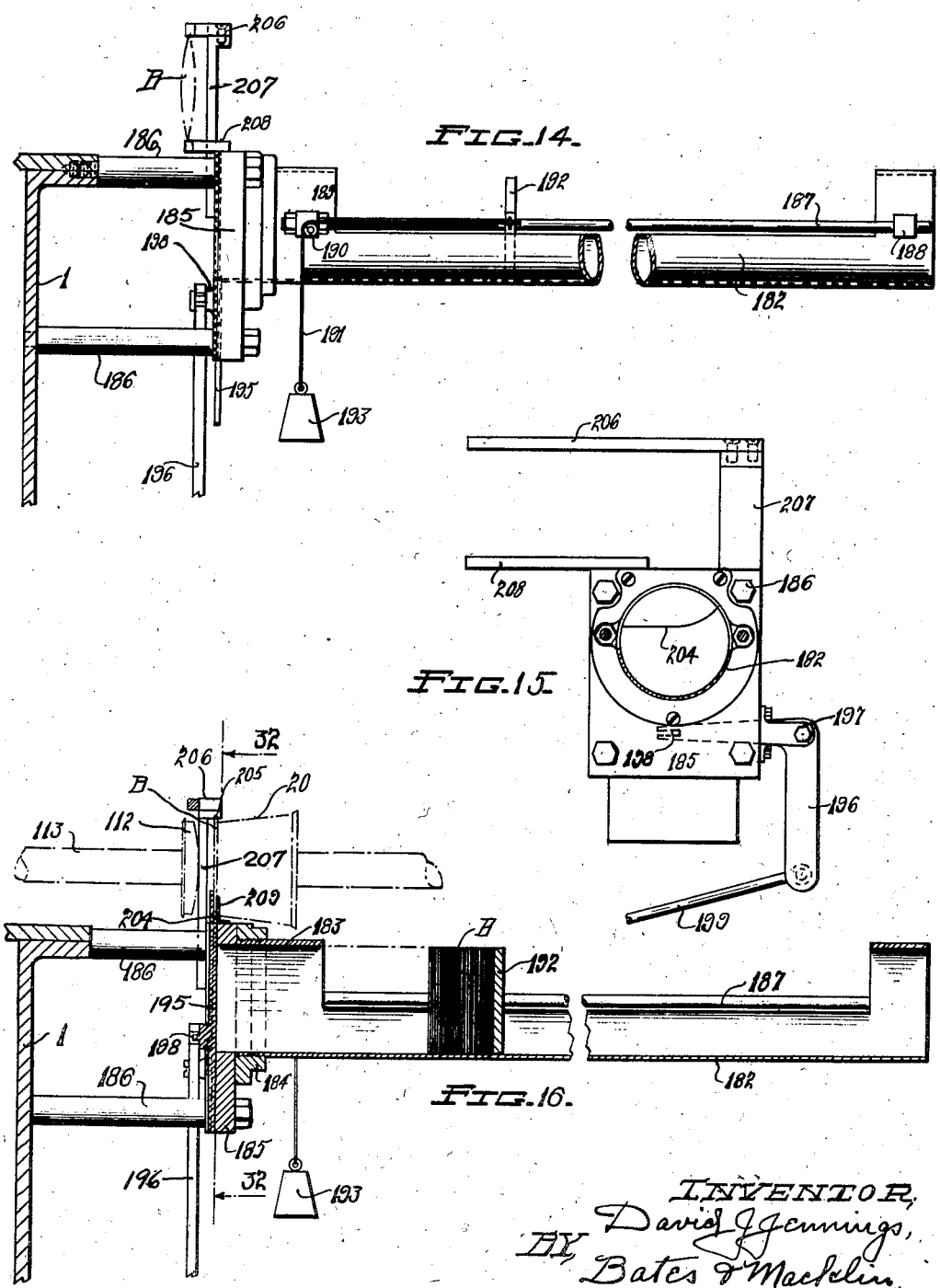

Dec. 9, 1924.

D. J. JENNINGS 1,518,514

MACHINE FOR THE MANUFACTURE OF PAPER RECEPTACLES

Filed Feb. 23, 1923    13 Sheets-Sheet 11

INVENTOR,
David J Jennings
BY Bates & Macklin
ATTYS.

Dec. 9, 1924.　　　　　　　　　　　　　　　1,518,514
D. J. JENNINGS
MACHINE FOR THE MANUFACTURE OF PAPER RECEPTACLES
Filed Feb. 23, 1923　　　13 Sheets-Sheet 12
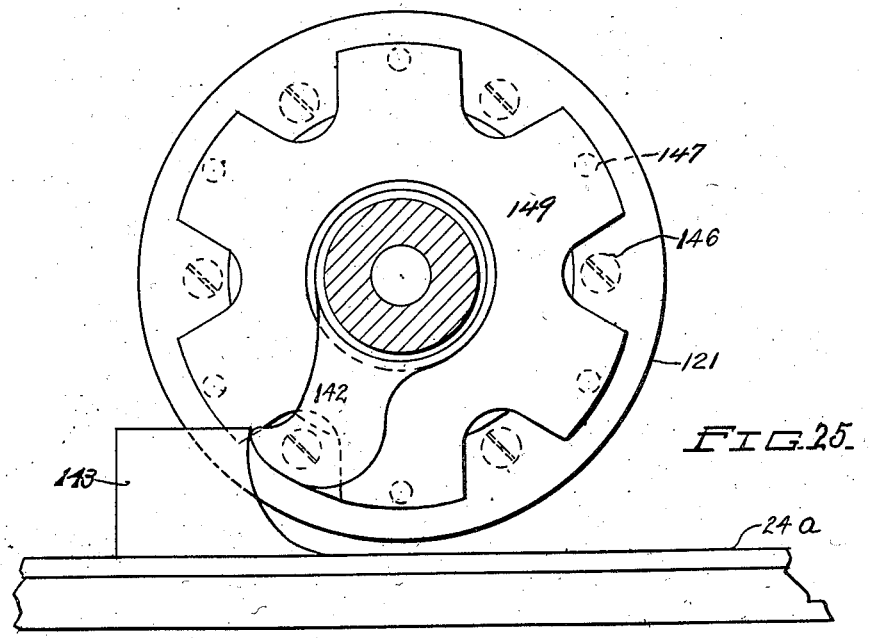
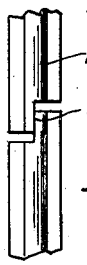
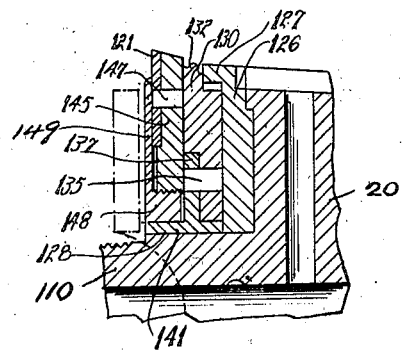
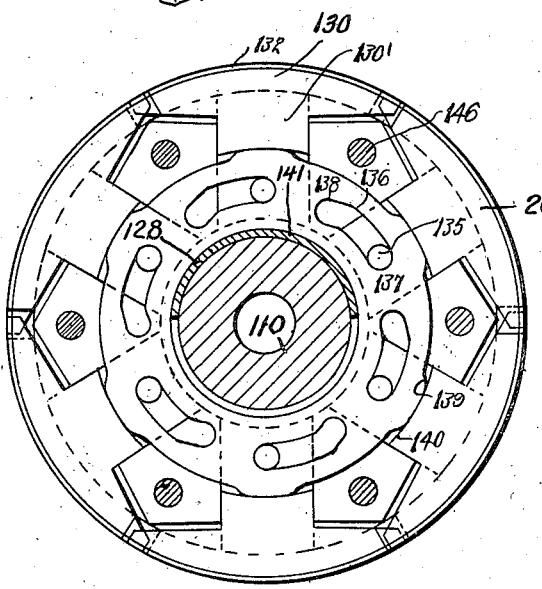

Patented Dec. 9, 1924.

1,518,514

UNITED STATES PATENT OFFICE.

DAVID J. JENNINGS, OF CLEVELAND, OHIO.

MACHINE FOR THE MANUFACTURE OF PAPER RECEPTACLES.

Application filed February 23, 1923. Serial No. 620,639½.

*To all whom it may concern:*

Be it known that I, DAVID J. JENNINGS, a citizen of the United States, residing at Cleveland, in the county of Cuyahoga and State of Ohio, have invented certain new and useful Improvements in Machines for the Manufacture of Paper Receptacles; and I do hereby declare the following to be a full, clear, and exact description of the invention, such as will enable others skilled in the art to which it pertains to make and use the same.

This invention relates to machines for manufacturing paper receptacles. The general object of the invention is to provide a machine adapted to cut the blank for the side wall or body of the receptacle, to form the same on a mandrel, to apply adhesive material to the paper during the formation to retain the shape given it, and then to remove it from the mandrel. A more specific object is to render the machine automatic and continuous in its operation to accomplish the rapid and efficient manufacture of such receptacles.

In the particular embodiment of my invention shown in the drawings, I have provided a machine for manufacturing paper receptacles of a type having a tapered or frusto conoidal side wall and disk-like bottom and top closures. Another object of the invention is to so construct the machine that it may position one of the end closures during the formation by holding it between two parts of the mandrel and causing it to form an interior groove in the wall of the receptacle, which it may permanently occupy. Still another specific object of the invention is to construct a simple efficient and positively acting device for transferring such disk-like end closures from a magazine to the moving mandrel and accurately positioning them thereon previous to forming the body of the receptacle.

Among still other objects, to become apparent in the following description, is the embodiment in such machine of a system of vacuum passages for causing the paper to be picked up and tightly rolled onto the mandrel, and also for use in insuring positive removal of the finished receptacle from the mandrel.

In the formation of such receptacles it is desirable to print certain matter on the exterior of the body and accordingly, another object of the invention is to provide a suitable mechanism and printing couple which may act on the paper forming the body before it is rolled onto the mandrel, whereby a flat printing member may coact with a corresponding platen, thus insuring an even impression.

The characteristic principles of this invention were set forth in my abandoned U. S. application Serial #29,119 filed May 19, 1915.

My invention is hereinafter more fully described in connection with the accompanying drawings, the essential characteristics thereof being summarized in the claims.

Figure 2:
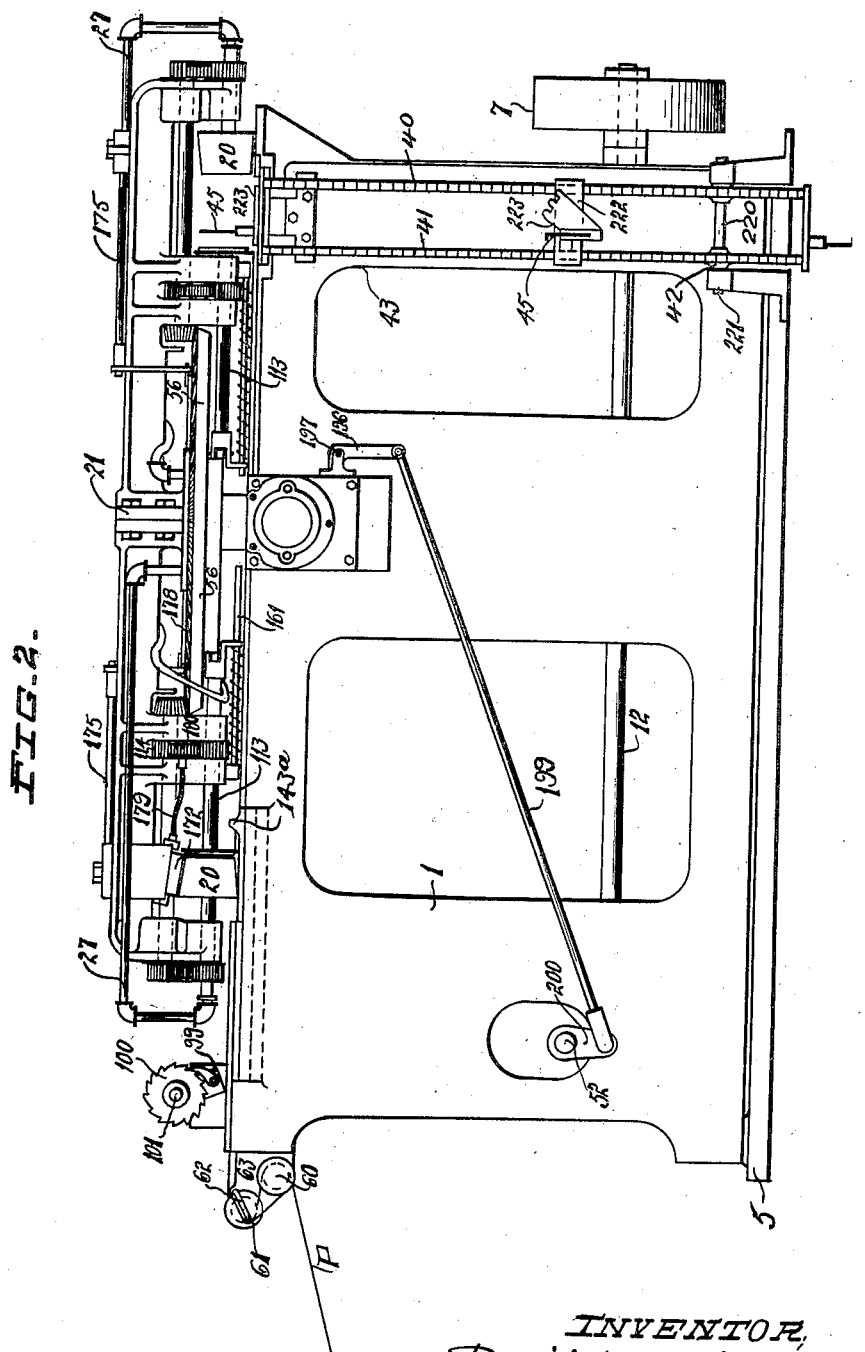
Figure 3:
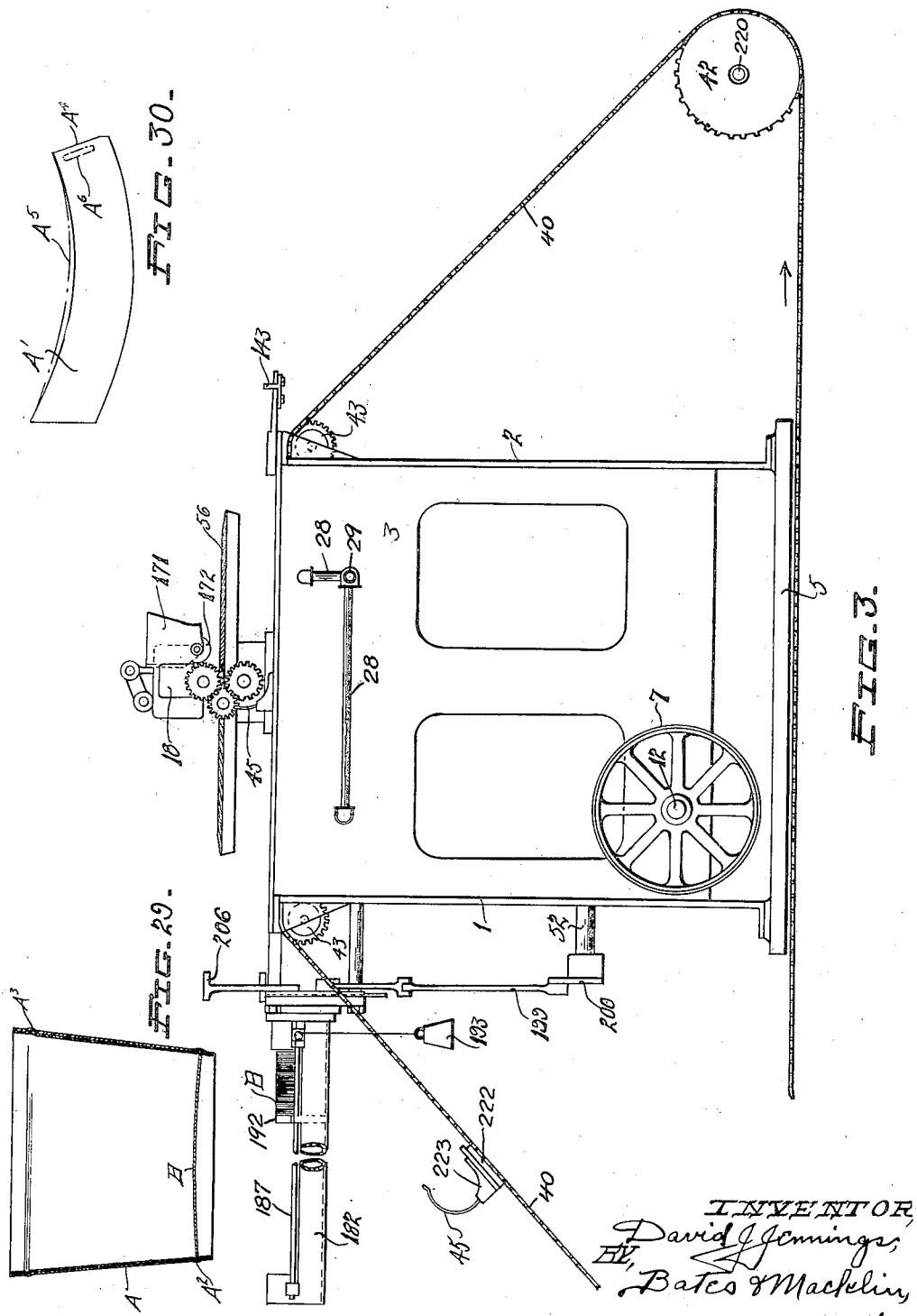
Figure 4:
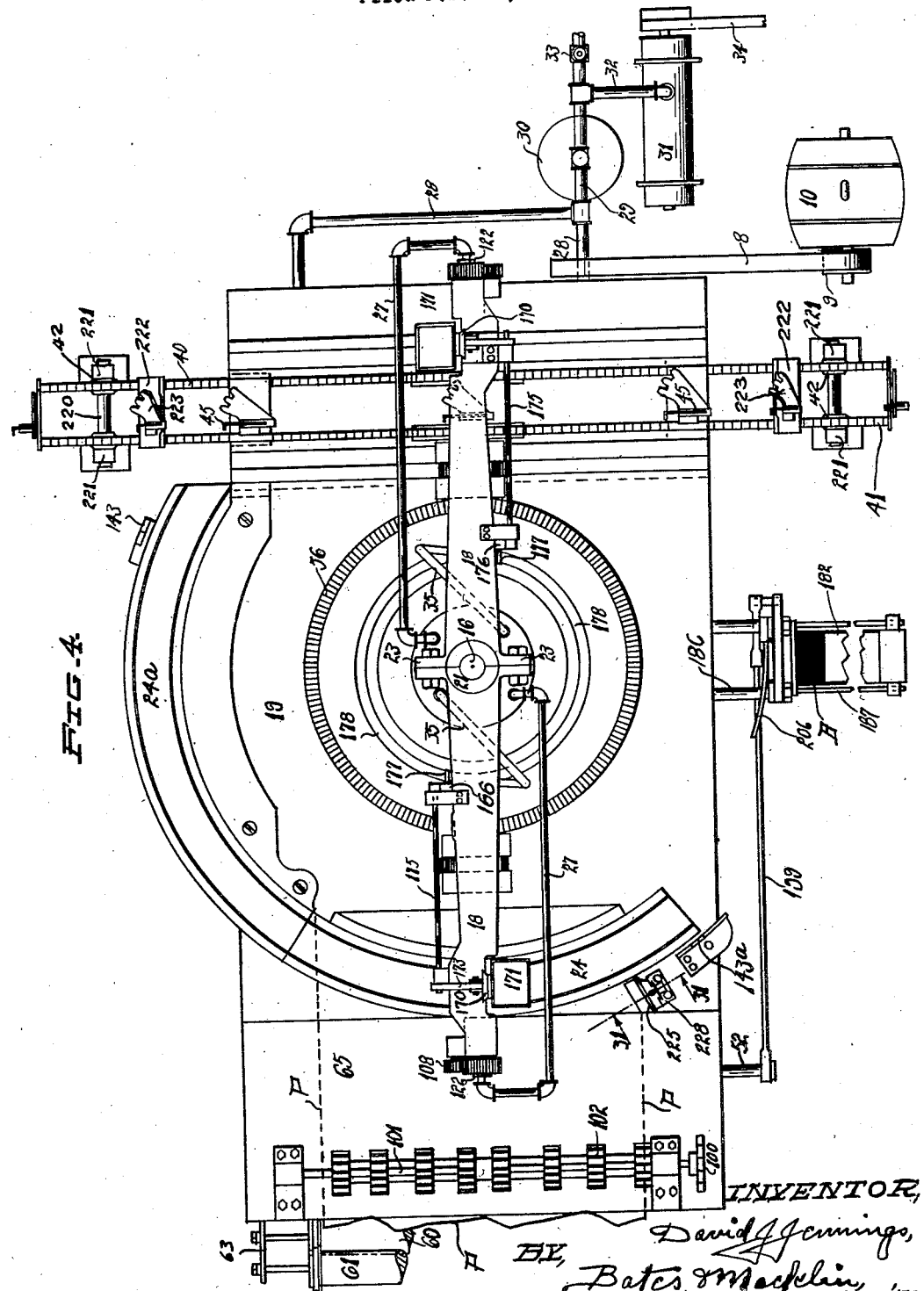
Figure 5:
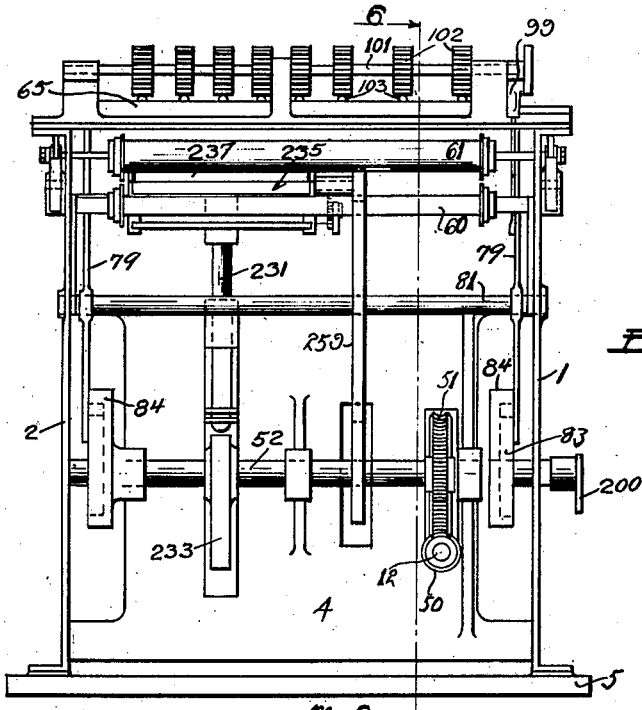
Figure 6:
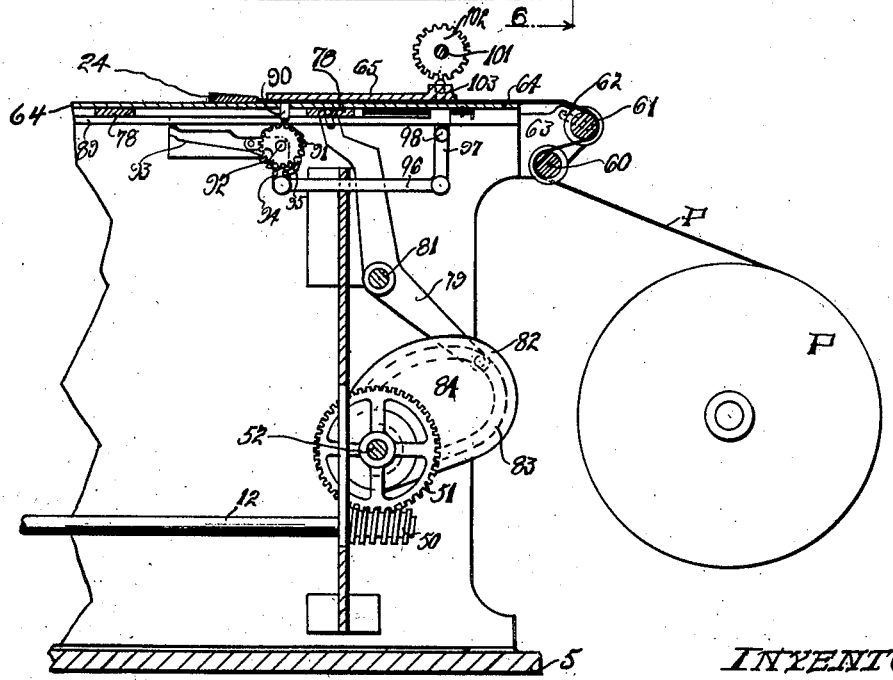
Figure 17:
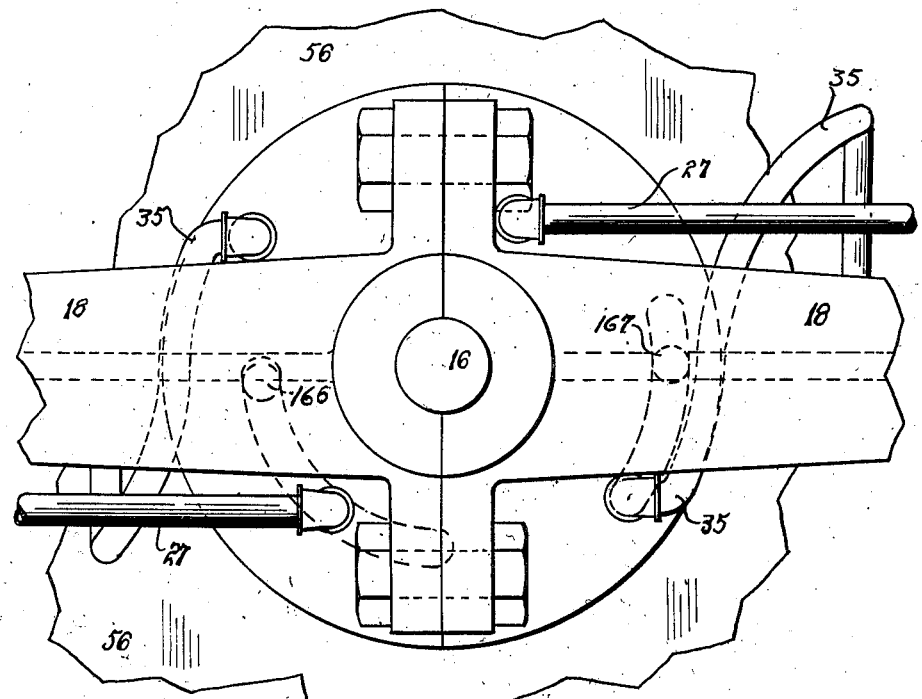
Figure 18:
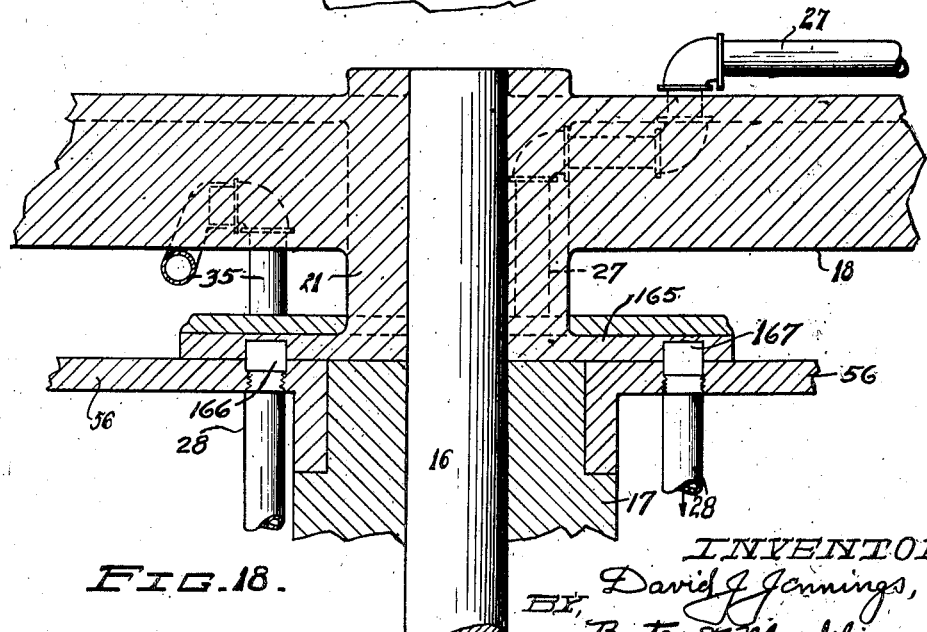
Figure 19:
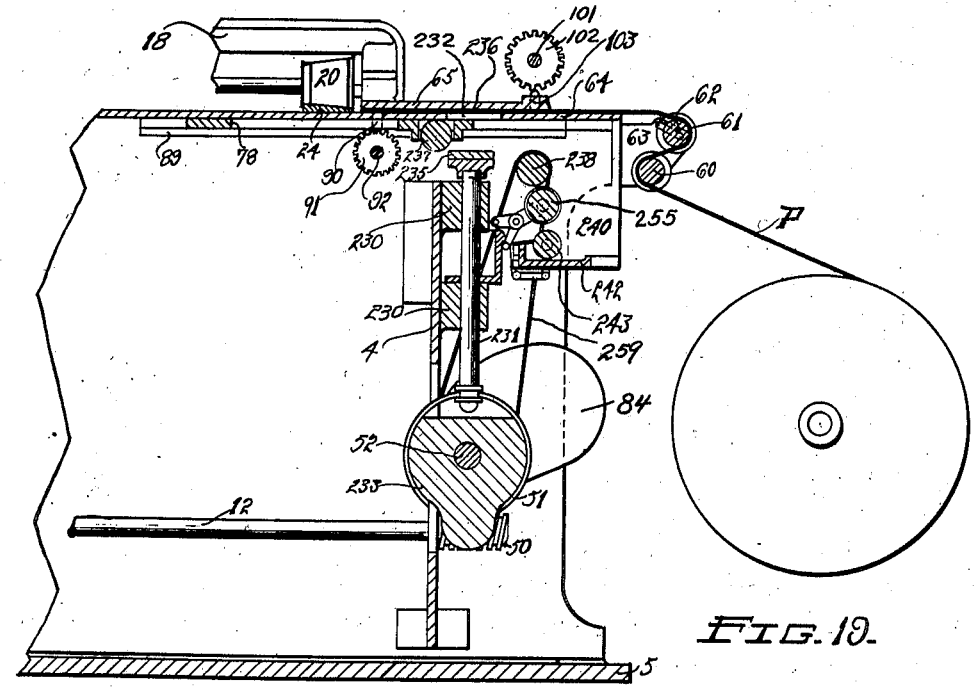
Figures 20, 21:
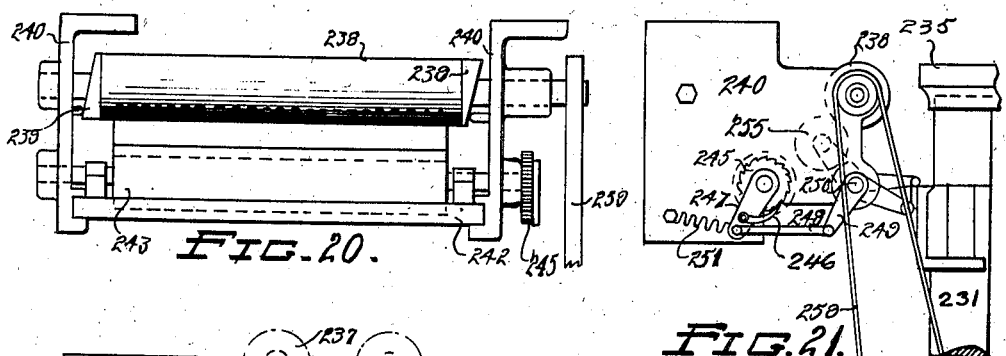
Figure 22:
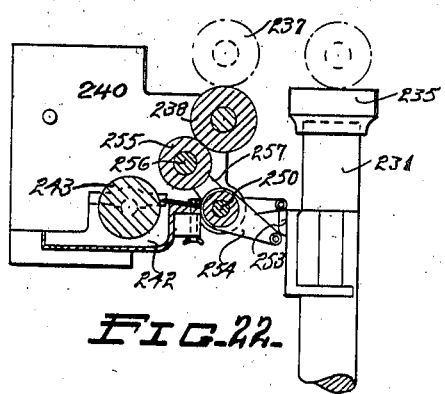
Figure 31:
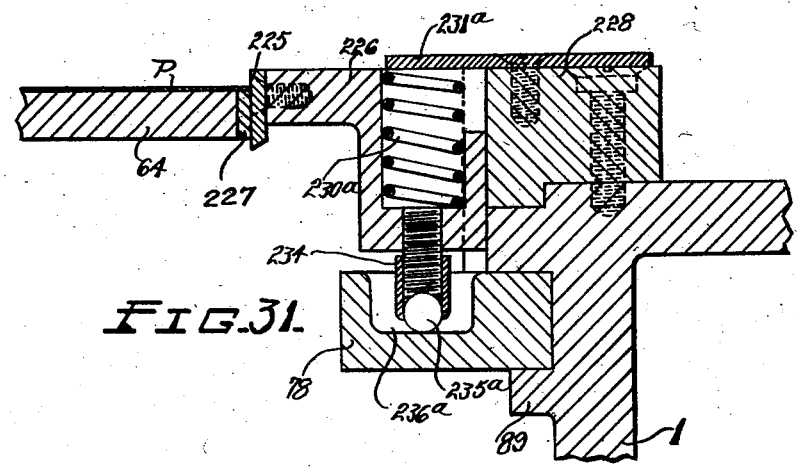
Figure 32:
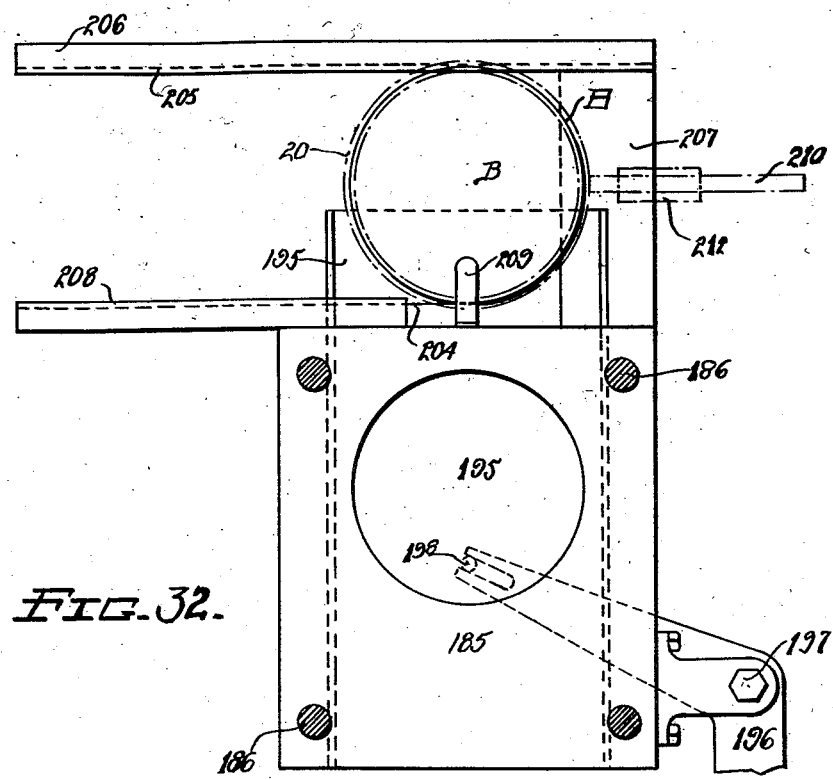

In the drawings, Fig. 1 is a side elevation of my machine, illustrating the method of feeding the paper thereto and the vacuum producing means and passages connecting the same with the mandrel; Fig. 2 is a side elevation of the machine on a somewhat enlarged scale, illustrating the operating parts more in detail; Fig. 3 is an end elevation of the machine at the driving end and showing the means for conveying the finished receptacles therefrom; Fig. 4 is a plan of the machine; Fig. 5 is an elevation of the printing and feeding end of the machine; that is, the end opposite that shown in Fig. 3; Fig. 6 is a fragmentary section through the feeding end of the machine, being taken on the plane indicated by the line 6—6 of Fig. 5; Fig. 7 is a vertical longitudinal section through the frame of the machine drawn to illustrate the arrangement of the power transmitting members. Figs. 2 to 7 inclusive are drawn to the same scale. Fig. 8 is in the nature of a longitudinal section through the mandrel arm and mechanism for actuating the same, shown on an enlarged scale; Fig. 9 is a fragmentary sectional detail, illustrating the mechanism for opening and closing the mandrel. The general plane of this section is indicated by the line 9—9 of Fig. 8; Fig. 10 is an end elevation of the mandrel arm showing the actuating gearing and paste receptacle; Fig. 11 is a transverse section through the arm taken on the plane indicated by the line 11—11 of Fig. 8; Fig. 12 is a side elevation of the outer portion of the mandrel arm and driving mechanism. Figs. 8, 10 and 11 are drawn to the same scale, while Fig. 12 is drawn on a somewhat smaller scale. Fig. 13 is a horizontal sectional detail, showing the movable finger for positioning the bottom disk in the mandrel, on the same scale as Fig. 8; Fig. 14 is a side elevation of a magazine for the bottom disks; Fig. 15 is a transverse section through the same looking toward the frame of the machine; Fig. 16 is a longitudinal vertical section through the same, illustrating the relative position of the mandrel parts at the time of receiving a bottom disk; Fig. 17 is a detail on a larger scale in the nature of a plan of the arms at the center of the machine, illustrating a valve mechanism and passages for vacuum; Fig. 18 is a vertical central section on the same scale through the passages and valve mechanism; Fig. 19 is a central section through the feeding end of the machine illustrating the printing mechanism and showing the course of the paper; Fig. 20 is a view showing the printing mechanism looking inwardly toward the same from the right hand end of Fig. 19; Fig. 21 is a side elevation of the printing mechanism therefor; Fig. 22 is a vertical transverse section looking in the same direction as Fig. 1, the section being taken through the printing mechanism and ink tray; Figs. 20, 21 and 22 are somewhat enlarged over Fig. 19; Fig. 23 (Sheet 1) is a longitudinal sectional detail on a larger scale of one of the reciprocating arms and feeding gripper fingers. Fig. 24 is a transverse section through the grippers on the same scale showing the method of slidably carrying them in the top plate of the frame: Fig. 25 is a large size sectional end elevation of the mandrel and a coacting cam on the platen; Fig. 26 is a sectional detail taken on a radial plane, illustrating the position of the parts of the mandrel when the bead is collapsed; Fig. 27 is a detail of the overlapping portions of the bead sectors; Fig. 28 is a sectional view through the mandrel, showing the bead sectors in elevation; Fig. 29 (Sheet 3) is a section, about one-half scale, through the finished receptacle; and Fig. 30 is a plan on the same scale as Fig. 4 of the blank cut to form the side wall; and Fig. 31 is a detail of a knife and its slide used to trim an edge of the blank shown in Fig. 30; Fig. 32 is an enlarged section on the line 32—32 of Fig. 16.

The receptacle which the present machine is designed to form is of the type illustrated in Fig. 29 on Sheet 3 of the drawings. As there shown the receptacle shows a side wall A formed from a blank A', illustrated in Fig. 30, of such a length that it may comprise more than one turn, preferably slightly more than two turns, held together by an intervening layer of adhesive material. The receptacle is provided adjacent its lower and upper portions with outwardly extending beads $A^2$ and $A^3$ adapted to receive the peripheries of paper disks forming the end closures of the receptacle. The present machine forms a receptacle with the bottom closure permanently positioned, as indicated at B. To form such a tapered wall, the paper comprising the wall should be cut with its edges in concentric arcs. I have found that a mandrel revolving in such an arc may simultaneously cut and roll such a blank onto itself. The ends of the blank may be left parallel as cut from a straight strip, or a single corner at $A^4$ may be trimmed off previous to its presentation to the mandrel and its platen for convenience in picking up the end of the paper by the mandrel.

The general arrangement of the machine is shown particularly in Figs. 1, 2, 3 and 4. The frame of the machine comprises side members 1 and 2, and walls 3 and 4 rising from the base 5, and supporting plates comprising several sections the functions of which will be hereinafter more fully described.

The driving pulley of the machine is designated 7. Fig. 4 illustrates power applied to this pulley by a belt 8 connected with a pulley 9 of a suitable motor 10. The pulley 7 is rigid on a shaft 12 extending longitudinally of the frame and having bearings in the end walls 3 and 4. Between the bearings embracing this shaft and extending outwardly from the side wall 1 is a worm 14 rigid on the shelf and meshing with and driving a worm wheel 15 rigid on a vertical shaft 16 having a bearing rising from the base and a bearing 17 formed in the top plate. This vertical shaft 16 rigidly carries at its upper end radially extending arms 18 and 18. These revolving arms carry rotatable mandrels 20 which are tapered as shown and coact with an arcuate platen 24 to form the receptacles, as will be hereinafter more fully described.

The arms, revolving with the shaft 16, cause the mandrels to cut and form the side walls of the receptacle from a continuous strip of paper indicated at P. This paper is preferably led from a large roll mounted on upright bearings 26 positioned adjacent one end of the machine, and is periodically fed across the platen ahead of each mandrel. The severed portion of the paper is caused to wind onto the mandrel by vacuum applied to passages 27 leading outwardly from the mandrel and inwardly along the arms and then downwardly as at 28, the passages 28 joining with a pipe 29 connected with a tank 30 from which the air is exhausted by a pump 31, connected with the tank by a pipe 32 and driven by a suitable belt 34. A suitable relief valve 33 is mounted in a pipe connected with the pipe 32. The passages 28 are alternately put into communication with the passages 27 and with passages 35 by valve mechanism to be hereinafter described, the passages 35 acting on the bottom of the receptacle to cause its removal from the mandrel after it is formed.

The completed receptacles may be carried away from the machine by parallel chains 40 and 41 running over pairs of sprockets 42 on opposite sides of the machine guided through the upper portion of the machine on idler sprockets 43, the chain being driven at a speed having such a relation to the speed of the arms that spring clip members 45 on the chain may embrace the receptacles as they are delivered from the mandrel, this speed being maintained by sprockets 46 (Fig. 7) on the shaft 47 driven by a pair of coacting bevel gears 48 and 49 on the shafts 47 and 16 respectively.

Before the paper reaches the platen it is led along a horizontal guide at the left hand end of the machine, so that I may avail myself of this space for the purpose of printing on the paper any label or legend it is desired to have appear on the exterior of the finished receptacle. The printing mechanism is also driven from the shaft 12 through a worm and gear 50 and 51 on this shaft and on a horizontal shaft 52 respectively, (Fig. 6) carrying the operating members for the printing and paper feeding mechanism, as will be described. The mandrel is positively driven at each end by gearing carried by the arms and actuated by pinions 55 meshing with a large crown bevel gear 56 rigidly carried by the upper portion of the frame, whereby the rolling contact between the mandrel and the platen is given the necessary precision and accuracy.

I will now describe the various parts of my machine more in detail in the following order, beginning with the feeding mechanism, the mandrels and their carrying arms, the means for applying adhesive material to the receptacle wall to hold its shape, the means for positioning a bottom closure in the receptacle during its formation, the mechanism for removing the receptacle from the mandrel, and lastly, the means for printing on the side wall of the receptacle.

*The feeding mechanism.*

A continuous strip of paper from the roll is led upwardly beneath a guide roller 60 and then over a guide roller 61 having small trunnion bearings movable in a slot 62 formed in the brackets 63 extending outwardly from the frame of the machine and supporting both of these rollers. The paper is then led forwardly over the top plate 64 extending across between the side plates 1 and 2. Above this plate 64 is a guide plate 65 terminating adjacent the outer edge of the platen 24, Figs. 5, 6, and 19.

The means for moving the paper forwardly is illustrated as slidably reciprocating grippers shown in Figs. 23 and 24 which comprise plates 67 rigidly mounted on vertically movable pins 68 extending downwardly through slide blocks 69 and each urged downwardly to pinch the paper between the top of the block and the plate by a spring 70 mounted in an opening surrounding the pin 68 and closed by a nut 71 threaded onto this pin and slidable in such opening. These blocks are reciprocated by rods 72 looping around the same and having a cross piece 73 engaging the forward side thereof and having a connecting cross piece 74 adapted to engage the rear side of the block after a period of lost movement to then push it forwardly. These rods extend through guiding ears 75 in a horizontal slide 78 actuated by bell-crank levers 79 having bifurcated ends engaging roller-carrying pins 80 on the slide. The bell-crank levers are pivoted on a shaft 81 and have laterally extending pins 82 embraced by rollers engaging face-cam grooves 83 in the cam members 84 mounted on the shaft 52. The gripper slides have laterally extending ribs engaging ways formed in the plate 64 while removable strips 82' embrace the upper sides of these ribs completing the guide ways.

The paper feeding mechanism thus described operates as follows: Upon each rotation of the shaft 52, the cams 84 reciprocate the bell-cranks, moving the upper arms thereof and reciprocating the slide 78 which may be guided in suitable ways 89 projecting inwardly from the side plates 1 and 2. On the inward movement of this slide the ears 76 causes a spring 85 on one of the rods 72 which bears at one end against the ear and at the other against the rigid collar 86, to be compressed until a small cam 87 on the slide 78 passes from beneath a ball-bearing in the pin 68, permitting the spring 70 to thrust this pin downwardly, causing the plate 67 to pinch the paper between it and the slide block 69. The grippers thus engage the paper at opposite edges and permit it to be advanced upon the engagement of said grippers by the cross piece 74 thereby bringing said paper a definite distance across the platen 24. Further advance movement of the slide 78 merely compresses the spring 85, and the cross piece 73 leaves the gripper block and the rods slide along it while the paper is being severed and rolled onto the mandrel. The return stroke of the bell-crank lever 79 and slide 78 brings the cross piece 73 into engagement with this block just as the cam 87 comes under the pin 68, raising the gripper plate free from the paper so that on the return stroke each gripper slides idly along the edge of the paper strip.

During the cutting of the forward edge of the paper and rolling of it onto the mandrel the paper is securely held from moving by a series of clamping pins arranged transversely of the plate 64 adjacent the platen and illustrated at 90, Figs. 6 and 19. These are slidably carried in bosses on the plate 64 and are urged upwardly by engagement of teeth 91 on wheels on a shaft 92 extending beneath and parallel with the row of gripping pins. This shaft is adapted to be given a partial rotation by an irregular cam groove 93 in a block carried by the slide 78 and acting on a bell-crank 94 there being a ratchet rigid on the shaft and actuated by a dog 95 on the bell-crank, whereby, upon each actuation of the slide, these pins are alternately released and raised again to the tops of the teeth 91 in which latter position they tightly press the paper to the guide plate 65. This bell-crank 94 is connected by a link 96 with a lever 97 pivoted at 98 and loosely articulated with a dog and carrying arm 99 actuating a ratchet 100 on a shaft 101 having similarly arranged toothed wheels 102 adapted to urge pins 103 downwardly into engagement with the paper on the plate 64 to grip the paper along a line ahead of the pins 90.

Upon each reciprocation of the slide and grippers the paper is advanced, and, as the size and weight of the paper roll varies, it is desirable to provide a take-up for the motion of the paper designed to keep the paper taut and yet permit its forward movement. This is accomplished by the loose roller 61 sliding in the sloping slots 62.

Mandrels, arms, etc.

Describing next the construction of the mandrels and revolving arms, the shaft 16 has a bearing 17 in a cross plate 19 adjoining the plate 64 and extending between the members 1 and 2 and having an upward cylindrical extension embraced by the hub of the crown gear 56, which is rigidly secured to said extension. Above this gear 56 and rigid on the shaft, and accordingly rotatable relative to the gear, are hub members 21 forming the abutting portions of the arms and clamped together over the shaft by bolts through outwardly projecting ears 23, thus forming in effect a single rigid arm extending each way from the shaft at the middle. These arms are preferably of cast metal, to permit forming suitable strengthening ribs, and they extend downwardly at their ends to carry integral bearings for the mandrel and the shafts driving the mandrel.

This mandrel driving and supporting mechanism, as shown, comprises a shaft 105 rigidly carrying the bevel pinion 55. This shaft is supported at its outer end in the downwardly turned portion of the arm and in bearings provided at its inner end by brackets 106 extending downwardly from the intermediate portion of the arm and preferably made integral therewith. At the outer end of the shaft 105 is a spur gear 107 meshing with an idler 108, (see Figs. 8 to 12 inclusive) on a stud shaft carried by the arm. This idler drives a gear 109 on a shank 110 integral with the mandrel 20. The axis of the mandrel and the axis of the shaft 105 are parallel and radial with reference to the shaft 16.

The mandrel comprises two parts, the main body portion and a base or clamping portion 112 rigidly carried on a hollow shaft 113 having bearings in the brackets 106. This shaft is slidable through these bearings and accordingly must be driven in synchronism with the mandrel which I accomplish by providing gears 114, and 115 on the shafts 105 and 113 respectively, and positioned between the separated brackets 106 whereby the shaft may drive through an idler 116 meshing with both these gears.

The taper of the mandrel must be such that its surface lies in a theoretic conical surface whose apex is coincident with the axis of the shaft 16. Accordingly, the platen must lie in a theoretic cone whose apex is coincident with the meeting point of the mandrel cone apex and the axis of the shaft. To provide for proper operation of the mandrel it is desirable to arrange the driving gearing as described, and accordingly, the gear 56 and its pinion 55 must have their pitch cones correspond to the cones of the mandrel and platen and their apexes must meet on the axis of the shaft 16 to insure perfect rolling contact of the mandrel with the platen.

The mandrel is adapted to cut the blank which when rolled onto the mandrel forms the side wall of the receptacle and is adapted to carry a disk of paper so that as the mandrel rolls over its platen, winding the side wall onto itself, the periphery of such disk forces the blank outwardly making a groove in the side wall and this permanently positions it as an end closure. This mandrel with its cutting and bottom positioning features and functions is described, illustrated and claimed in my Patent No. 1273497 issued July 23rd, 1918, and my application No. 166,590, filed May 5, 1917. The rotary knives at each end of the mandrel are described and claimed in my application on a device for making paper receptacles, No. 173,920, filed June 11, 1917.

Referring particularly to Figs. 8, 9 and 25 to 28 inclusive, the body of the mandrel is tapered and its inner end presents a concave surface to the convex surface of the clamp 112, whereby a bottom closure B may be gripped between the clamp and mandrel and be distorted from its normal plane while its periphery projects past the surface of the mandrel, as shown in Fig. 8, thus enabling it to coact with a groove 117 (Fig. 8) in the platen to press the material of the side wall outwardly forming the groove which it permanently occupies. At each side of the platen 24 is an arcuate knife 118 and 119 respectively coacting with circular knives 120 and 121 on the clamp and mandrel respectively. As the mandrel rolls these knives cut the blank from the original strip.

The end of the blank is picked up by any suitable means on the mandrel preferably by suction, the tubes 27 leading to the end of the hollow shank 110 through a swivel connection indicated at 122 which communicates with passages 124 leading to a longitudinal opening 125 in the surface of the mandrel. This opening firmly holds the end of the blank against the mandrel preventing slipping and shifting as it rolls, causing it to be tightly held thereon. The arrangement of the knives and the specific construction of the mandrel is illustrated particularly in Figs. 25 to 28 inclusive. As the larger end of the mandrel is a head member 126 positioned by a shoulder 128 so that its periphery forms a continuation of the surface of the mandrel. This head is provided with a series of radial guide passages or grooves in which are slidably mounted the shanks of collapsible bead sectors 130. These sectors terminate in shoulders adapted to be retained and have their outward movement limited by an overhanging flange 127 integral with the head. The sectors are preferably in the nature of heads on the slides which divide the circle into six parts and carry aligned outwardly projecting beads 132 coacting when in their expanded position with a groove 133 in the platen 24. These beads form in effect a continuous annular rib adapted to press the paper of the wall of the receptacle outwardly into this groove to form a top closure receiving groove.

To make this bead 132 substantially continuous when expanded and still permit it to contract by drawing the sectors inwardly simultaneously, I provide at 134 (Fig. 27) cutaway portions adjacent the end of each sector forming overlapping surfaces cut substantially to the center of the bead, as shown.

The shanks 130' of these sectors are provided with rigid pins 135 coacting with cam slots 136 in a flange 137. These cam slots have surfaces concentric with the axis of the mandrel terminating in inwardly directed actuating surfaces 138, while the shanks of the sectors are cut away to admit the flange 137. On the periphery of the flange is a series of shoulders 139 adapted when the bead is expanded to take the burden of the pressure against coacting shoulders 140 on each of the sectors.

It will be seen that by rotating the flange a short distance the bead may be expanded or collapsed corresponding to the movement given by the operative portions 138 of the cam slots. Thus, to rotate this flange and cause the collapsing or expanding of the bead, I form this flange integral with a sleeve 141 rotatable on the annular shoulder 128 of the shank 110, and on this sleeve I provide a radially extending actuating member 142. This actuating member is adapted to co-act with the cams 143ª and 143 rigidly affixed on the frame 1 and along a continuation 24ª of the platen 24 respectively and having a sloping surface co-acting with the member 142 to cause a movement of the sleeve with relation to the mandrel by advancing in the first instance and retarding the rotation of the sleeve in the second instance according to the edge of the cam the actuating member engages as the mandrel rolls past the cams 143ª and 143. Thus after the blank has been rolled onto the mandrel, the actuating member 142 engages the cam 143 and is actuated to present portions 138 of the slots to the pins 135 thus withdrawing the bead and bringing it within the periphery of the mandrel, which is the position shown in Fig. 26. In this movement of the actuating member and its flange the shoulders 139 are moved out of the path of the shoulders 140.

Outside the flange and movable bead sectors, I provide a disk 145 positioned by screws 146, and on this disk is carried the knife 121 positioned in turn by dowel pins 147 and held in place by a clamp 149 having a series of spring fingers overhanging the knife and having a threaded shank 148 coacting with threads on the disk 145.

The purpose of providing the collapsible bead just described is to permit the finished receptacle to be withdrawn from the mandrel. This withdrawing is accomplished by moving the shaft 113 and clamp 112 inwardly toward the shaft 16 as the mandrel comes to the side of the machine opposite the platen. At the inner end of the shaft 113 is provided a block 150 connected with the shaft and prevented from longitudinal movement with relation thereto by a pin 151 extending through the shaft and engaging an annular groove in the periphery of a shank 152 integral with the block and rotatably embraced by the bore of the hollow shaft 113. A suitable ball-bearing is provided at 153 for receiving the thrust against this block to actuate the shaft and firmly press the clamp to the mandrel. This is accomplished by means of rollers 154 carried on an upright pin 155 in the block arranged to present the rollers to a downwardly turned flange 156 of a cam member 157 secured to the under side of the rigid gear 56. The contour of this cam member is illustrated in Fig. 9, and it will be seen that it has a concentric portion corresponding to the position of the platen and opposite the platen the cam is led inwardly toward the shaft 16 as indicated at 158. A spring 160 on a rod 161 rigidly secured in an ear 162 formed on the bracket 106 presses against this ear at one end and against an ear 163 rigid with the block 150 at the other end of the spring, thus causing the rollers to contact with the cam 156 and follow the same, whereby the clamp 112 is withdrawn from the mandrel 20 a distance sufficient to remove the receptacle from the mandrel, which, as before stated, occurs at a time when the bead 132 is collapsed. The receptacle is caused to follow the clamp by suction applied to the passage of the shaft 113 from the connection 35 which is made flexible to follow the movement of the shaft. The inwardly extending portion 158 of the cam ends in an abrupt step meeting the outward lead 159 of the cam to cause an abrupt movement of the shaft 113, so that the portion of the receptacle that overlaps the periphery of the clamp 112 may be freed from the clamp suddenly as the grippers, to be hereinafter described, embrace the receptacle to carry it way from the machine.

The arrangement of the vacuum passages is illustrated most clearly in Figs. 1, 4, 17 and 18, where it will be seen that the tubes 27 lead from the connections 122 at the end of the mandrel and then inwardly and downwardly to a rotary valve device adapted to control the application of the vacuum, permitting its most effective and economic use. The valve shown comprises simply outwardly extending flanges 165 formed integral with the inner ends of the arms 18 and thereby rotatable with the shaft 16. This flange tightly fits the upper surface of the gear member 56, while the passages 28 communicate at 166 and 167 with openings through this gear member covered by the rotatable valve flange.

*Paste applying mechanism.*

I will next describe the means for applying adhesive material to the body as it is rolled onto the mandrel. Mounted in a vertical guideway formed in the arms 18 is a slide 170 (Fig. 4) rigidly carrying a laterally projecting receptacle 171 substantially closed at the bottom by a roller 172 (Figs. 3 and 10) adapted to be brought into contact with the paper on the mandrel and to be raised therefrom.

To raise and lower this paste receptacle I provide an arm 173 pivoted at 174 to the slide and mounted on a rock shaft 175 leading along the arm, as shown in Fig. 4, and adapted to be actuated to raise or lower the paste pot by an arm 176 having a laterally projecting pin 177 engaging an arcuate cam 178 mounted on the upper surface of the gear 56. Thus, at the proper time, the roller 172 may be brought onto the paper on the mandrel to apply paste thereto between the layers and overlapping portions. It is also desirable to rotate the roller 172 at the same peripheral speed as the mandrel to insure even application of the paste. This may be accomplished by attaching a flexible shaft 179 (Fig. 12) to a gear 180 meshing with the gear 114 on the shaft 105. This flexible shaft causes continuous rotation of the roller while permitting vertical movement of the paste receptacle.

*Bottom disk mechanism.*

I now describe the mechanism for automatically positioning a bottom closure in the mandrel previous to the mandrel reaching the next blank to be rolled on the platen. As shown, (particularly in Figs. 14, 15, 16, and 32) I have provided an outwardly extending magazine 182 in the form of a cylindrical member having its upper portion cut away to provide, for the greater part of its length, an open trough. This cylinder is threaded at its inner end at 183 into a ring 184 secured to a vertical block 185 positioned by studs 186 secured to the frame and side wall 1. Along the sides of this magazine are rods 187 parallel therewith and positioned by ears 188 at the outer end thereof and secured by nuts to ears 189 at the inner end of the magazine, the ears being mounted on a portion of the magazine not cut away. On each ear 189 is shown a pulley 190 over which runs a cord 191 secured to a slide 192 fitting the magazine and adapted to urge the bottom closure disks B inwardly toward the machine by reason of the weight 193. The pulley, cord, weight and co-acting parts are duplicated on each side of the magazine.

The closure disks are placed in the magazine in upright position, making a continuous series, the innermost closure of which fits against a slide 195 vertically movable in ways formed on the block 185. The slide may be actuated by a bell-crank 196 pivoted to a bracket secured to the side of the block 185, the end of one arm of the bell-crank being bifurcated and embracing a pin projection 198 on the slide. The other arm of this bell-crank is pivoted to a rod 199 extending along the side of the machine and actuated by a crank 200 on the end of the shaft 52, (Fig. 3) whereby it may be actuated up and down twice for every rotation of the shaft 16, that is, one raising movement each time a mandrel passes the magazine.

The magazine is preferably so positioned that the mandrel passes just above the same as indicated in broken lines in Figs. 16 and 32. The cam 156 is so arranged that its final outwardly extending portion 203 (Fig. 9) is reached by the rollers 154 to give the final outward movement to the shaft 113, bringing the clamp 112 to the mandrel at a time to grip a bottom closure disk raised by the slide 195. To insure this slide raising, at each time, only one disk to be presented to the mandrel, I have provided a cut-away portion on the inner face of the slide, as indicated at 204 which forms an arcuate shoulder adapted to fit the edge of the disk for a portion of its periphery, but the width of this shoulder is less than the thickness of the disk. Thus, as the slide is raised, the disk B is brought above the magazine and into the path of the mandrel, being guided between the slide and block 185 until it engages a groove 205 in an arm 206 mounted to present this groove in an arcuate path, concentric with the mandrel path and secured by an upright member 207 rising from the block 185. A parallel arm 208 extends from the block below the arm 206, and is also provided with a groove guiding the lower edge of the disk until clamped by the mandrel.

To hold the disk to the slide and present it to the groove 205, I have shown a leaf-spring 209 secured to the upper edge of the block 185 adapted to press the disk to the slide, and I so form this spring to clear the mandrel as it moves past the same. This spring is of such a length and is so formed that it may not press the disk from its path and yet may coact with the slide when in the position shown in Fig. 32 to insure positioning of it vertically. It will be noted that the shoulder 204 extends horizontally from its arcuate portion toward the left in Fig. 32, thus registering with the bottom of the groove in the arm 208.

The disk is thus positioned vertically with relation to the mandrel, and to complete the centering of the disk in the mandrel I may provide a laterally positioning device as follows: A finger 210 is carried radially of the mandrel by the mandrel arm 18 (Figs. 10, 12, 13 and 32). This finger comprises a slide guided in the end of a bracket arm 212 secured by screws 213 to a boss 214 on a downward extension at the end of the arm 18. As the movement of the paste receptacle is synchronized with the action of the mandrel I may so arrange the cam 178 that it may properly actuate the finger 210 as shown. A downwardly extending strip 215 is secured to the lower side of the paste receptacle and is provided with a cam surface 216 adapted to engage a pin 217 on the finger 210 to urge the same inwardly to the position indicated in broken lines at 210ª, Fig. 13, engaging the side of the disk B moving the disk with the mandrel. As this positioning finger travels with the mandrel it cooperates with the guides 206 and 208 and so centers the disk with relation to the mandrel that its periphery projects evenly from the surface of the mandrel when clamped therein.

In order that this positioning finger 210 may not interfere with the rolling of the paper onto the mandrel, I have provided a spring 218 secured at one end to the bracket 212 and at the other end to the finger 20 and adapted to urge the same outwardly from the mandrel whereby as the paste receptacle is brought down toward the mandrel, just before the paper is picked up, the cam surface 216 will release the pin 217 and allow the positioning finger to be withdrawn to the position shown in solid lines in Fig. 13. In this position sufficient clearance is provided for the paper to be wound on the mandrel. While I have shown a gravity actuated follower for moving the bottom disks along the magazine and presenting them successively to the slide 195, it is to be understood that a spring or screw advancing mechanism may be substituted therefor with satisfactory results.

*Receptacle removing mechanism.*

Referring now to the device for taking the receptacle from the mandrel and conveying the same from the machine, I have arranged mechanism adapted to intercept the receptacle in its circular path and convey the same away from the mandrel without interfering with the continuous movement of the latter.

To accomplish this removal I may use a pair of conveyer chains 40 and 41 heretofore mentioned. As stated, these chains run over sprocket wheels 42 mounted on shafts 220 carried in suitable journal brackets 221 at each side of the machine. As shown, the lower reaches of the chains run horizontally beneath the machine, then upwardly over one pair of sprockets 42, shown at the extreme right hand in Fig. 3, to one pair of sprockets 43, and then horizontally across the top of the machine just beneath the path of the mandrel, and thence across the other pair of sprockets 43 and downwardly across the other pair of lever sprockets 42, as shown in Fig. 4. These chains are preferably connected by rigid transverse carriers 222 suitably secured to the chains and pivotally carrying rotatable plates 223, which carry the spring clips 45 adapted to embrace the finished receptacle.

As shown, this chain is driven by the sprockets 46 (Fig. 7) previously mentioned, deriving motion from the shaft 16. The speed of the chains and the spacing of these receiving clips is such that the clips arrive at the point substantially above the sprockets 46 just as the mandrel clamp is separated most widely from the mandrel body, as indicated in Fig. 9, thus bringing the receptacle and the clip together. The chain moves slower than the mandrel, whereby the receptacle is thrust into this spring clip and the mandrel continues its movement, passing around its path ahead of the receptacle, which is entirely freed from both the mandrel and clamp 112 as the rollers 154 pass off from the receding portion 158 of the cam 156.

During the time in which the next receptacle is rolled on the opposite mandrel the next clip 45 is brought to the position above the sprocket wheels 46 to receive the next finished receptacle. The sprockets 46 are preferably positioned just beneath the position of the mandrel at which the receptacles are removed so that any looseness in the chain is compensated for at this point, thus insuring the receiving clips being properly synchronized with the movement of the mandrel.

In practice these chains carry the receptacles through a tank of melted paraffine wax, or like material, and thence through drying chambers, being alternately inverted and brought to their upright position by toothed members engaging teeth on the rotatable plates 223, to insure proper draining of the wax material during the drying thereof. This dipping and drying apparatus is not illustrated in this application as it forms no part of the present invention. Various modifications of the device for removing the receptacles from the mandrel may be used and adapted to cooperate with the dipping and drying apparatus for treating receptacles, formed on the machine herein illustrated and described.

Printing mechanism.

As previously stated, it is desirable to print a descriptive label on the receptacle. I have found that this may be effectively and economically accomplished by printing upon the paper before severing the same from the original strip to form the blank comprising the side wall of the receptacle. This permits the use of a flat type-form or plate and a corresponding flat platen, insuring a clear cut impression and securing economy in the manufacture of the printing mechanism. This printing mechanism is arranged at the front part of the machine, and is shown particularly in Figs. 5, 6 and 19 to 22 inclusive. On the end wall or cross bracket 4 are suitable bearings carrying the shaft 52, and above this shaft are bearings 230 for a vertically reciprocable plunger 231 bearing at its lower end on a cam 233 rigid with the shaft 52 and adapted to move the plunger upwardly to present a type form or plate 235 to the paper at 236 which is exposed through an opening 232 in the plate 64, the plate 65 being reinforced to form a suitable platen and withstand the proper printing pressure. The actuation of this cam 233 causes the plunger to meet the paper at a time when the clamping pins 90 and 103 are holding the same against movement and during the time when the mandrel is rolling and cutting the side wall from the forward edge of the paper.

The cam 233 is provided with a rest portion for holding the type in position to receive ink from a roller 237 carried by the slide 78, heretofore described. This slide is actuated by the bell-crank 79 at a time when the cam thus presents the type to the roller 237, and this roller 237 receives its ink from a roller 238 carried in suitable bearings formed in depending brackets 240 secured to the under side of the plate 64. These brackets are connected at their lower ends by a rigid channel-shaped member forming an ink tray indicated at 242. A roller 243, journaled in the brackets 240 and presenting its lower side to the ink, is actuated to move through successive partial rotations by a ratchet and pawl indicated at 245 and 246 respectively. This pawl is carried on an arm 247 moved in one direction by a link 248 actuated by an arm 249 on a rock shaft 250, the return of the pawl being accomplished by a spring 251. The rock shaft 250 is actuated by a cam 253 on the plunger 231 acting against a small roller carried on the end of the arm 254 rigid with the shaft 250.

An ink transfer roller 255 is mounted on a shaft 256 carried on arms 257 rigid with the rock shaft 250. Upon each operation of the plunger therefore, the roller 243 is given a partial rotation during which the roller 255 is in contact therewith. Upon a further movement of the plunger, the cam 253 acts to move the roller 255 into contact with the roller 238 which is constantly rotated by a belt 259 running over a pulley on an extension of the shaft of this roller, and by reason of cams 239 on the ends of this roller it is given the usual longitudinal movement. During this cycle of operation, the roller 237 is presented for a time to the roller 238 and is then moved across the type form upon the forward movement of the slide 78. Further movement of the cams 233 moves the plunger upwardly and presents it to the paper at 236.

It will be seen from Fig. 5 that the printing plunger is positioned at one side of the machine so that the impression is made on the blank in the position permitting the paper to be given more than one turn about the mandrel and still present the printed impression at the exterior. In this connection it may be stated that the paste receptacle is moved upwardly after applying paste to the receptacle wall being formed, for a sufficient distance to insure paste being between the layers of the wall, and before the portion comprising the exterior of the wall is presented thereto, thus paste is not applied to the printed surface.

To insure a clear understanding of my machine, I will now briefly describe its complete operation. Starting with the empty mandrel having just delivered its receptacle to the receiving clips on the chains 40 and 41 it continues its revolving movement, and the rollers 154 coacting with the portion 159 of the cam 156 on the under side of the rigid gear 56, thrusts the clamp 112 of the mandrel outwardly toward the same until it nearly meets the mandrel, being separated only slightly as it reaches the position above the magazine the slide of which has been actuated to bring a bottom disk into the path of the mandrel. The paste receptacle in this position is raised. Accordingly the cam 216 carried thereby is raised. The positioning finger 210 is moved inwardly closely adjacent the surface of the mandrel, and, as this positioning finger engages the edge of the disk, it is immediately moved at the same speed as the mandrel, and the portion 203 of the cam actuating the clamp 112 closes this clamp tightly against the disk, giving it the slightly convex form described and firmly holding it with its periphery projecting evenly at all points beyond the mandrel surface.

With the mandrel carrying the bottom disk thus positioned, and rotating by reason of the pinion 55 actuating the shaft 105 and driving the mandrel through the gears 107, 108 and 109, the expanding bead 132 of the mandrel is expanded so that the bead may project into the coacting groove in the platen. This expansion is accomplished by the operating member 142 engaging a cam 143ª (Figs. 2 and 4) secured to the top plate of the machine adjacent the beginning of the platen 24. This cam 143ª acts to advance the rotation of the member 142 with relation to the mandrel, thus moving the member 137, bringing the parts to the relative position shown in Fig. 28.

While the mandrel is approaching the platen, the horizontal slide 78 and grippers 67 (Figs. 23 and 24) are moved forwardly, bringing a new section of the paper across the mandrel. The paper presented to the mandrel preferably has its edge trimmed off as indicated at A⁴ (Fig. 30) by a knife 225 Figs. 4 and 31. The actuation of this knife may occur upon the recession of the horizontal slide 78 as it trims off the paper at a point becoming the end of the next blank. This knife is carried on a vertical slide 226 having a dove-tailed slide connection with a block 228 secured to the top plate. This vertical slide carries in a suitable cavity a spring 230ª bearing downwardly against the horizontal slide and acting at its upper end against a plate 231ª screwed to the block 228.

The plate 231ª has a narrow projection extending over the spring 230ª and acts in a cut-away portion in the vertical slide 226 to permit said slide to be moved vertically. The horizontal slide 78 is provided with a cam surface 236ª within a suitable recess and is adapted to co-act with the ball 235ª within the stud 234 and the vertical slide 226 to actuate the knife blade 225 and elevate said knife above the plate 64 and knife strip 227 to permit the passing of the paper under said knife 225. Upon the reverse movement of the horizontal slide 78 the spring 230 causes the vertical slide 226 and its co-acting members to be forced downwardly thereby shearing the paper strip so as to form the end of the paper blank at the proper angle whereby the same will lie in a line parallel to the axis of the mandrel when the mandrel reaches said blank. This knife extends inwardly to the outer edge of the platen, whereby, when the circular knife 121 of the mandrel severs the blank from the remaining portion of the paper, it also cuts the third side of a small triangular piece of paper, the knife 225 cutting the second side. The first side being the original edge of the paper this little waste portion falls below the overhanging portion on the slide 226 and is thus freed from the strip before it is presented to the mandrel.

The movement of the paper, being accomplished by the actuation of the slide 78 through the bell-cranks 79, cams 83 and shaft 52 driven by the main shaft 12 which also drives the arms 18, properly synchronizes the actuation of the paper with the clamping of the bottom disk into the mandrel. At this time the mandrel presents its longitudinal opening 125 to the paper, at A⁶, Fig. 30, and the valve formed in the flanges 165 on the arms opens the passage 28 communicating with the passage 27 (in the position shown in Fig. 17). This causes the suction to pick up the end of the paper, which is simultaneously severed at the arcuate edges by the knives 120 and 121, and to firmly hold it to the mandrel as it rolls along the strip. The bottom disk during this rolling operation presses the paper downwardly into the groove 117 in the platen forming the groove which it permanently occupies in the wall of the receptacle, and at the same time the bead 132 presses the paper into the groove 133 forming the bead A³ which may later receive a similar disk, closing the receptacle after it has been filled with any material it is designed to contain.

During this rolling operation the pins 90 and 103 are firmly holding the paper to prevent it moving sideways consequent upon the cutting and rolling, and while it is clamped the cam 233 actuates the printing plunger to make an impression on the under side of the paper. As the mandrel is first presented to the paper the paste receptacle is lowered through the actuation of the arm 176 by the cam 178 rocking the shaft 175 to present the paste applying roller 172 to the paper curling about the mandrel. After the paper has been wrapped around the mandrel and sufficient length remains to make substantially one turn, the cam 178 causes the paste roller to be raised, thus avoiding applying the adhesive material to the surface becoming the exterior of the receptacle. This raising movement, however, is not sufficient to move the slide finger 210 into contact with the paper on the mandrel. The further raising movement, required to cause it to engage and position the disk, is accomplished by a higher part of the cam 178 arranged to position this finger properly just before the mandrel approaches the bottom magazine.

The mandrel now rolls along a continuation of its platen shown at 24ª as formed by an extension plate at the side of the machine, the vacuum valve closing the passage 27 and a moment later opening the passage 35 to apply vacuum to the bottom disk of the cup. While this mandrel is continuing this movement, the cams 83 through the bell-crank 79 cause the next actuation of the slide 78 releasing the grippers 67 and moving them idly along the edges of the paper. They are then caused to take a new grip, whereupon the forward movement of the slide moves the paper inwardly to present a sufficient portion for the next receptacle. The movement of the slide just described causes the roller 237 to carry ink from the roller 238 across the type.

The mandrel, before leaving the continuation of the platen which has the function of tightly pressing the layers of the wall together and insuring their adherence, reaches the cam 143 which actuates the bead operating member 142 by retarding its movement while the rotation of the mandrel continues uniformly, thus causing the cam slots 136 to withdraw the bead sectors until the bead portion is within the outer surface of the mandrel. The rollers 154 now come upon the receding portion 158 of their cam, whereupon the spring 160 urges the shaft 113 inwardly withdrawing the clamp member 112 from the mandrel, and as the vacuum is applied to the passage through this shaft from the passage 35 and the passages 28, the receptacle adheres to the member 112 and is carried with it off from the mandrel body. The receptacle has now reached the position over the conveyer chains, and is travelling at a greater speed than the said chains thereby overtaking the spring clips 45 and depositing itself in one of said clips to be conveyed thereby to the paraffine. At this instant the receptacle is freed from the member 112, which is withdrawn by the abrupt step of the cam 156, from the flange of the receptacle below the bottom disk. At the same instant the vacuum passages applying suction to the base of the receptacle are closed so that as the receptacle is picked off atmospheric air is prevented from following the passage past the valve. The separated mandrel parts move on past the receptacle and are brought toward each other, and the cam 178 again positions the slide finger 210 to engage a bottom disk raised by the slide 195 from the magazine.

It will be seen that by proper gearing ratios between the driving shaft 12 and shaft 16 the operation of a single mandrel is readily duplicated by another diametrically opposite driven from the same gear 56, one acting to roll the mandrel while the other is discharging the completed receptacle, and so on through the cycle.

Having thus described my invention, what I claim is:

1. In a machine for making paper receptacles, the combination of means for feeding a continuous strip, a platen across which the strip is fed, a mandrel coacting with the platen and rolling on the same, means on the mandrel and platen for cutting from the strip the paper required to form the wall of the receptacle, and means for holding a disk of paper and rolling the edge of the disk into such wall during its formation.

2. In a machine for making paper receptacles, the combination of a frame, feeding mechanism carried thereby and adapted to advance a continuous strip of paper, a mandrel for forming the receptacle, means for rolling it crosswise of said strip, means on the mandrel for cutting from the strip the blank required for the receptacle wall, and grippers adapted to engage the edge of the strip for holding the paper adjacent the platen while the mandrel cuts and rolls the wall portion.

3. In a machine of the character described, the combination of a frame, a reciprocating feeding mechanism thereon adapted to engage and advance a continuous strip of paper, a platen across which the paper is advanced, a mandrel coacting with the platen and adapted to move crosswise of the strip and cut from the paper a portion thereof to form the side wall of the receptacle, feeding mechanism including reciprocating grippers engaging the edge of the strip, and means for rendering them inactive on their return movement.

4. A machine for making paper receptacles, comprising a frame, a platen, a mandrel adapted to be rolled across the platen, and a clamp adapted to coact with the end of the mandrel and to hold an end closure for the receptacle between it and the mandrel during the rolling of the receptacle wall, and means for bringing paper to the platen to be rolled onto the mandrel.

5. A machine for making paper receptacles comprising a rotating mandrel, a coacting platen, a member adapted to engage the mandrel and arranged to hold a closure for the receptacle between it and the mandrel, means for separating said member from the mandrel to permit the removal of a receptacle, and means for bringing such closure to the mandrel and for bringing paper to comprise the side wall to the platen.

6. A machine for making paper receptacles comprising a revolving and rotating mandrel, a coating arcuate platen, a member adapted to engage one end of the mandrel and arranged to hold a closure for the receptacle between it and the mandrel, means for moving said member longitudinally from the mandrel to permit the removal of a receptacle, and means for bringing such closure to the mandrel and for supplying paper to the platen.

7. A machine of the character described, the combination of a plurality of mandrels, means for causing the mandrels to travel in a circuit, a coacting platen adjacent to a portion of such circuit, means for causing the mandrel to roll over the platen, means for bringing paper stock to the platen and mandrel, means for causing the stock to be rolled onto the mandrel, and means adapted to engage the exterior of the receptacle for removing the receptacle from the mandrel at a portion of its path.

8. A machine for making paper receptacles including a plurality of revolving and rotating mandrels, arms carrying said mandrels, and means for revolving the arms, means on the arms for causing the rotation of the mandrels on their own axes, a coacting platen over which the mandrel may roll, means for holding a disk of paper against the mandrel with the periphery of the disk projecting and means for bringing the paper to the mandrel and platen and causing it to be rolled onto the mandrel and the projecting edge of said disk.

9. In a paper receptacle manufacturing machine, the combination of a plurality of mandrels, a corresponding plurality of independently supported end clamps permanently aligned therewith, a revolving frame carrying the mandrels and clamps with their axes radial with relation to the center of revolution, and means on the revolving frame for driving the mandrel and clamp at the same speed while permitting their separation.

10. A machine for making paper receptacles comprising a frame, revolving arms carried thereby, mandrels on the arms with their axes radiating from the center of revolution, disk-like end clamps carried by the arms independently of the mandrel but with their axes aligned therewith, means carried by the arms for revolving the mandrels and end clamps and a coacting platen member for holding the paper in position to be rolled onto both the mandrel and the edge of the end clamp.

11. A machine of the character described, the combination of an arcuate platen, a revolving and rotating mandrel coacting with the platen and comprising a body section and a clamp portion adapted to clamp a closure disk between the body and clamp, means revolving the mandrel and clamp in an arcuate path, means for separating the mandrel and clamp, means including a valve having relatively rotatable parts near the center of rotation, and passages leading to the valve from the body portion of the mandrel and from its clamp.

12. A machine of the character described, the combination of an arcuate platen, a revolving and rotating mandrel coacting with the platen and comprising a body section and a clamp portion adapted to clamp a closure disk between the body and clamp, means revolving the mandrel and clamp in an arcuate path, means for separating the mandrel and clamp, and means including a rotary valve and passages leading to the valve from the body portion of the mandrel and from its clamp, one of said passages including a flexible tube.

13. In a machine of the character described, the combination of a mandrel means for revolving the same in an arcuate path, a coacting platen in such path, means for presenting paper to the platen to be rolled onto the mandrel, and means for clamping the bottom disk to one end of the mandrel including a member separable from the mandrel but axially movable with relation to the mandrel.

14. In a machine of the character described, the combination of a mandrel, means for moving the same in a circuit, a coacting platen adjacent to such circuit, means for presenting paper to the platen to be rolled onto the mandrel, means for clamping the bottom disk to one end of the mandrel including a member separable from the mandrel but axially movable with relation to the mandrel, and means for presenting a bottom disk to the path of the mandrel to be clamped between it and said member without interfering with its continuous movement.

15. In a machine of the character described, the combination of a revolving mandrel, a platen over which the mandrel rolls, means for moving the mandrel continuously in an arcuate path comprising a revolving frame member, means on said frame member for rotating the mandrel incident to its revolution, means for bringing paper stock to the mandrel and platen and means for holding a projecting bottom disk against the end of the mandrel during the rotation of the latter in contact with said paper.

16. A machine for making paper receptacles, the combination of a frame, a platen thereon, a mandrel coacting with the platen, means carrying the mandrel for continuously revolving the same in a circuit, means for rotating the mandrel incident to its revolving movement, means for bringing paper stock to the platen to form the side of the receptacle, means for bringing end closure disks to the mandrel, a disk-like member clamping said end closure disk to the mandrel, said platen coacting with the edge of said end closure disk for forming a recess in the side wall of the container adjacent said end closure disk and means for driving all of said mechanism to permit a continuous uninterrupted movement of the mandrel.

17. In a machine for making paper receptacles, the combination of a mandrel, means for moving the same in a path, a mandrel along said path over which the mandrel rolls, the platen having a clamping member for securing a bottom disk thereto, a magazine for bottom disks, means for feeding the disks one at a time to the path of the mandrel, and means for causing the mandrel clamp to engage and hold the same with its periphery projecting beyond the mandrel while the body of the receptacle is being rolled.

18. A machine for making paper receptacles including a mandrel, a coacting platen over which it rolls, a paper feeding mechanism for presenting paper stock to the platen to be rolled onto the mandrel, a magazine for bottom disks, means for feeding them to the path of the mandrel, means connected with the mandrel for engaging and moving such disk with the mandrel in contact with the paper on the platen and means for clamping the disk to the mandrel without interfering with its progress.

19. A machine for making paper receptacles including a mandrel, means for revolving the same about the center, means for rotating the mandrel, means movable with relation to the mandrel and adapted to clamp a bottom disk between itself and the end of the mandrel, a positioning member mounted independently of the mandrel and movable laterally with relation to the mandrel, and means for feeding bottom disks one at a time to the path of the space between the mandrel and said clamp.

20. A machine for making paper receptacles including a mandrel, means for rotating the mandrel, means movable with relation to the mandrel and adapted to clamp a bottom disk to the mandrel, a positioning member mounted independently of the mandrel and movable laterally with relation to the mandrel, means for feeding bottom disks one at a time and holding them in a position to be engaged by said member, means for actuating said member to move it to position the disk in the mandrel path and thereafter withdraw therefrom, and means for supplying paper to be rolled onto the mandrel.

21. In a machine for making paper receptacles, the combination of a mandrel, means for rolling paper onto the mandrel, a clamp for securing a bottom disk to the mandrel and adapted to be axially separated therefrom to receive the disk between it and the mandrel, means for moving the disk into receiving position, a magazine for carrying a column of disks, means for feeding them toward the mandrel, and means actuating the feeding means, said feeding means adapted to separate only the end disk from the column and move it to the path of the mandrel.

22. A machine for making paper receptacles including the combination of a mandrel, a clamp member adapted to engage and hold a disk between it and the end of the mandrel, means for revolving the clamping member with the mandrel and for moving the same to and away from the mandrel, a reciprocating member on the arm adapted to be moved close to the periphery of the mandrel to engage and position a disk presented to the path of the mandrel, means for withdrawing said reciprocating member from its engaging position to a distance slightly removed from the mandrel to permit paper to be rolled onto the mandrel and about the periphery of the disk.

23. In a machine for making paper receptacles, the combination of a mandrel, a revolving arm carrying the same and a shaft carrying the arm, the mandrel axis being radial with relation to said shaft, a platen coacting with the mandrel, means for feeding paper to the mandrel, a paste receptacle carried by the mandrel arm, and means for transmitting paste from the receptacle to the paper on the mandrel.

24. A machine for making paper receptacles, the combination of a mandrel, a platen coacting with the mandrel, means for supplying paper to be rolled onto the mandrel, means for applying paste to the paper comprising a paste receptacle, means for rotating the mandrel, a roller for transmitting paste from the receptacle to the paper on the mandrel, and means for moving the paste receptacle and roller toward and from the mandrel.

25. A machine for making paper receptacles, the combination of a mandrel, a support carrying the mandrel, means for supplying paper to be rolled onto the mandrel, means for applying paste to the paper comprising a paste receptacle movably mounted on the mandrel support, means for rotating the mandrel, a roller for transmitting paste from the receptacle to the paper on the mandrel, and means for rotating the roller at substantially the same peripheral speed as the mandrel.

26. A machine for making paper receptacles including the combination of a mandrel, a support for carrying the mandrel, means on the support for rotating the mandrel, means supplying paper to be rolled onto the mandrel, means applying paste to the paper including a paste receptacle movably mounted on the mandrel support, driving means on said support and a flexible shaft connected with the driving means, a roller driven by the flexible shaft and adapted to transmit paste from the receptacle to the paper on the mandrel surface, and means for moving the receptacle and roller toward and away from the mandrel.

27. A machine for making paper receptacles including the combination of a mandrel and platen, a movable arm carrying the mandrel, means on the arm for rotating the mandrel, means supplying paper to be rolled onto the mandrel, means applying paste to the paper including a paste receptacle movably mounted on the arm, driving means on said arm, a roller driven thereby and adapted to transmit paste from the receptacle to the paper on the mandrel surface, a stationary cam, and a member connected with the paste receptacle coacting with the cam for moving it toward and away from the mandrel consequent upon the movement of the arm.

28. A machine for making paper receptacles including the combination of a platen, a mandrel coacting therewith, a mandrel carrying means, a means on the carrying means for rotating the mandrel, a slide mounted on said carrying means, a paste receptacle carried by the slide, means for transmitting paste from the receptacle to the paper adapted to be rolled onto the mandrel, and a stationary actuating cam for moving the slide to cause the paste transmitting means to contact with the paper or be separated from the mandrel.

29. A machine for manufacturing paper receptacles comprising a frame having a top plate, a platen carried thereby, a mandrel coacting with the platen, means for moving the mandrel across the same, means for feeding a continuous strip of paper across the platen including a reciprocating slide, moving transversely to the movement of the mandrel, grippers engaging the paper carried by the slide, and guide rollers carried by the frame and over which the paper is led.

30. In a machine for making paper receptacles, the combination of a platen, a mandrel, means for moving the mandrel across the platen, means for cutting a blank to form a paper wall of a receptacle, means for feeding a continuous strip of paper to the platen including a periodically actuating member engaging the paper, a supply roll and guide rollers over which the paper is led, means for clamping the paper during the rolling and cutting thereof, one of said guide rollers being movable to cause a substantially even tension on the paper and take up the slack thereof.

31. In a machine for making paper receptacles, the combination of a platen and mandrel rolling over the platen and adapted to cut the paper to form the receptacle wall, means for feeding a continuous strip of paper to the platen including a guide comprising parallel plates embracing the paper, a series of members on one of the plates adjacent the platen, and means for pressing said members against the paper toward one of the plates for clamping it during cutting.

32. In a machine for making paper receptacles, the combination of a platen and mandrel rolling over the platen and adapted to cut the paper to form the receptacle wall, means for feeding a continuous strip of paper to the platen including a guide comprising parallel plates embracing the paper, a series of members on each plate adapted to be moved toward the other, and means for pressing them against the paper toward the opposite plate.

33. In a machine for making paper receptacles, the combination of a frame, a platen and mandrel in rolling contact, knives on the platen and mandrel for severing a paper blank from a continuous strip, means for feeding said strip to the platen, and means for cutting a section of the paper at a point to leave a severed corner of the blank to be rolled onto the mandrel.

34. In a machine for making paper receptacles, the combination of a frame, a platen carried thereby, a mandrel rolling over the platen, means for feeding a continuous strip of paper to the platen, knives on the platen and mandrel for severing a paper blank from such continuous strip, and means for cutting a section of the paper at a point to leave a severed corner of the blank to be rolled onto the mandrel, such means including a reciprocating knife under which the paper is moved and adapted to be positioned to cut an edge substantially parallel to the axis of the mandrel.

35. A machine for making paper receptacles comprising a frame, a platen, a mandrel rolling on the platen, coacting knives on the mandrel and platen for cutting a blank from a continuous strip, means for feeding such strip across the platen, and means for trimming a corner of the blank before it reaches the platen including a knife under which the paper is moved, means for depressing the knife, said knife being positioned to cut an edge on a line substantially parallel with the axis of the mandrel.

36. A machine for making paper receptacles comprising a frame, a platen, a mandrel rolling on the platen, coacting knives on the mandrel and platen for cutting a blank from a continuous strip, means for feeding such strip across the platen, and means for trimming an edge of the blank before it reaches the platen including a knife under which the paper is moved, a depressible slide carrying the knife, yielding means for depressing the slide, and means actuated by the feeding mechanism for raising the slide.

37. The combination of a platen, a mandrel rolling over the same, a knife along one side of the platen, a circular knife on the mandrel coacting therewith for severing the blank from the end of the continuous strip, means for trimming a corner of the blank before it reaches the mandrel including a knife extending from the arcuate knife outwardly from the platen and at an angle with relation to the edge of the paper, and means for moving the knife to sever from the paper strip a triangular piece, one side of which is the original edge of the paper, the second cut by the arcuate knife and the third by the depressible knife.

38. A machine for making paper receptacles, including the combination of a platen, a mandrel moving across the same, means for feeding a strip of paper to the platen, a guide for the paper including a flat plate, means for printing on the paper including a type form, means for moving the type form to the paper against the flat plate, and means for actuating the mandrel and paper feeding means and printing means in proper synchronism.

39. A machine for making paper receptacles, including the combination of a platen, a mandrel moving across the same, means for feeding a strip of paper to the platen, a guide for the paper including a flat plate, means for printing on the paper including a type form, means for moving the type form to the paper against the flat plate, said feeding means being reciprocating, and an ink transfer roller carried by the feeding means adapted to be moved across the type form by the reciprocating of the feeding means.

40. A machine for making paper receptacles including the combination of a platen, a mandrel moving across the same, a reciprocating feeding means for moving a strip of paper across the platen, means for printing the paper before it reaches the mandrel including a type form, a movable slide for the type form, inking means including an ink transfer roller carried by the reciprocating means and adapted to be moved thereby across the type form, driving means for the machine including a shaft having a cam actuating the feeding means, and a cam actuating the type form.

41. A machine for making paper receptacles including the combination of a platen, a mandrel moving across the same, a reciprocating feeding means for moving a strip of paper across the platen, a means for printing on the paper before it reaches the mandrel including a type form, inking means including an ink transfer roller carried by the reciprocating means and adapted to be moved thereby across the type form and driving means for the machine including a shaft having members for actuating the feeding means and the type form.

42. In a machine for making paper receptacles, the combination of a frame, a vertical shaft, a radial arm on the shaft, a revolving mandrel carried on the radial arm, a rigid gear member concentric with the vertical shaft, a bevel gear meshing therewith and driving the mandrel, and an arcuate platen over which the mandrel rolls.

43. A machine for making paper receptacles including the combination of a frame, a drive shaft, a mandrel, a revolving arm carrying the same, a shaft carrying the arm and driven from the drive shaft, an arcuate platen on the frame concentric with said driven shaft, a stationary bevel gear carried by the frame, a radial shaft on said arm, a pinion on the radial shaft meshing with the bevel gear and rotating incident to the revolution of the arm and mandrel, and gearing from the radial shaft to the mandrel.

44. A machine for making paper receptacles including a frame, a horizontal shaft, a vertical shaft, a worm and gear connecting said shafts, revolving arms on the vertical shaft and mandrels carried thereby with their axes radial, a platen over which the mandrels roll, means for feeding paper across the platen, a shaft for operating the same, a worm and gear connecting said last named shaft with the horizontal shaft, the feeding mechanism including a reciprocating member actuated by the last named shaft, means for clamping bottom disks to the mandrel, and means driven from one of said shafts presenting bottom disks to the path of the mandrel to be so clamped.

45. In a machine for making paper receptacles, the combination of a mandrel, a revolving arm carrying the same, an arcuate platen coacting with the mandrel the latter having a separable portion, means for moving one portion toward the center of revolution incident to the revolving of the same, a conveyer, and means for grasping the exterior of the receptacle and drawing it off the mandrel when the mandrel parts are separated.

46. A machine for making paper receptacles comprising a frame, a platen, a mandrel coacting with the platen, a conveyer, a gripper thereon, means for supplying the paper to be rolled onto the mandrel, means for removing the receptacle so rolled from the mandrel, the movement of the mandrel with relation to the conveyer being such that the gripper is forced over the receptacle.

47. A machine for making paper receptacles, comprising a platen, a mandrel coacting with the platen, means for supplying paper to be rolled onto the mandrel, a conveyer having members for receiving the receptacles and conveying them away from the mandrel, the mandrel having a separable portion for moving the receptacle therefrom and adapted to release the receptacle as it is embraced by the conveyer member.

48. A paper receptacle manufacturing machine including the combination of a traveling mandrel, a stationary platen coacting with the mandrel, means for feeding the paper across the platen, a conveyer movable transversely of the path of the mandrel, and means for withdrawing the receptacle from the mandrel just as it is engaged by the conveyer.

49. A paper receptacle manufacturing machine including the combination of a mandrel moving in a circuit, a platen coacting with the mandrel, means for supplying paper to the platen, and a conveyer separated from the platen and movable transversely of the path of the mandrel, the conveyer moving slower than the mandrel and having spring clips thereon for embracing the receptacle and into which the receptacle is thrust by the movement of the mandrel.

50. In a machine for making paper receptacles, the combination of a platen and coacting mandrel both formed on theoretic conical surfaces whose apices are coincident, means for moving the mandrel about an axis extending through the meeting points of said apices and at right angles to the base of the platen cone, and means for rotating the mandrel on its own axis at right angles to the axis first mentioned.

51. In a machine for making paper receptacles, the combination of a coacting platen and mandrel having their surfaces formed on theoretic cones whose apices are coincident, means for revolving the mandrel across the platen and about a center extending through the meeting point of said apices, and means for rotating the mandrel on its own axis including a gear concentric with the center of revolution and a bevel pinion carried on the mandrel carrying means and meshing therewith and connected with the mandrel.

52. A machine for making paper receptacles including the combination of an arcuate platen and a tapered mandrel adapted to roll over the same, said mandrel and platen having their surfaces coincident with theoretic cones whose apices are coincident, a revolving arm carrying the mandrel about an axis extending through the meeting point of said apices, a bevel gear concentric with the center of revolution of the mandrel, a bevel pinion, and gearing driven by said pinion and revolving the mandrel on its own axis.

53. A machine for making paper receptacles including the combination of an arcuate platen and a tapered mandrel adapted to roll over the same, said mandrel and platen having their surfaces coincident with theoretic cones whose apices meet, a revolving arm carrying the mandrel about an axis extending through the meeting point of said apices, a bevel gear concentric with the center of revolution of the mandrel, a bevel pinion, and gearing driven by said pinion and revolving the mandrel on its own axis, the pitch cones of the bevel gear and bevel pinion being proportional to the angles of the theoretic cones of the mandrel and platen respectively.

54. In a machine for making paper receptacles, the combination of a mandrel, a revolving support having bearings carrying the mandrel with its axis radial with relation to its center of revolution, a shaft journaled in the arm with its axis parallel to the axis of the mandrel, gearing connected to the mandrel and shaft, a stationary gear concentric with the revolution of the mandrel, a pinion on said shaft meshing therewith, a mandrel clamp having its shaft axially aligned with the mandrel and journaled on the support, a gear splined to said shaft and driven from the other shaft carried by the support.

55. In a machine for making paper receptacles, the combination of a mandrel, a revolving support carrying the mandrel, a stationary gear, a pinion meshing therewith, a mandrel clamp having its shaft axially aligned with the mandrel, a gear splined to said shaft and driven from the pinion, and means for sliding the clamp shaft through the gear embracing it including a stationary cam, and coacting means on the shaft engaging the cam.

56. The combination of a platen, a revolving arm, a mandrel carried by the arm and adapted to be rolled over the platen, means carried by the arm for driving the mandrel, a separable portion of the mandrel journaled in axial alignment with the mandrel, a shaft rigid with the same, means for driving the shaft and permitting its longitudinal movement, a stationary cam, a block revolubly embracing the shaft but prevented from axial movement with relation thereto, and rollers carried by the block and coacting with the cam.

57. In a machine for making paper receptacles, the combination of an arcuate platen, a revolving arm, a mandrel journaled to the arm and rolling over said platen, the mandrel comprising separable sections each having a shaft portion journaled to the arm, gearing carried by the arm for driving each portion of the mandrel, one of said portions having its driving gear splined thereto permitting axial movement, a stationary cam, and a member carried by the movable shaft actuated by said cam consequent upon the revolution of the arm.

58. In a machine for making paper receptacles comprising a frame, an arcuate platen mounted thereon, a shaft, a revolving arm carried on the shaft, a mandrel journaled to the arm and adapted to be rolled over the platen and comprising separable sections, one section being axially movable, a stationary gear concentric with the shaft, a pinion meshing therewith, a shaft on the arm carrying the pinion, gearing connecting said shaft with each section of the mandrel, a stationary cam for bringing the movable section toward the center of revolution or moving it outwardly therefrom, a bottom disk magazine, means for feeding the disks singly to the path of the mandrel to be clamped between the mandrel sections, means for feeding a strip of paper to present its forward edge to the mandrel to be severed, coacting knives on the mandrel and platen for cutting the blank from the paper, means for printing on the paper before presented to the mandrel, a paste receptacle carried by the arm, means controlled by the driving mechanism on the arm for transmitting paste from the receptacle to the paper on the mandrel, and a conveyer for receiving the receptacle from the mandrel when its parts are separated.

59. In a machine of the character described, the combination of a revolving and rotating mandrel, a coacting arcuate platen, the mandrel having an expanding and contracting bead, the platen having a coacting groove, means for feeding paper across the platen to be rolled onto the mandrel, whereby the bead may form a groove in the wall of the receptacle, and an actuating member carried by the mandrel for expanding and contracting the bead.

60. A machine for the manufacture of paper receptacles comprising a mandrel for forming the sides of a receptacle, means for holding a disk adjacent thereto so as to force the peripheral edge of said disk into the sides of the receptacle during the wrapping of said sides on said mandrel, in combination with means for displacing said disk holding means and removing the receptacle from said mandrel.

61. A machine for the manufacture of receptacles comprising a mandrel for forming the sides of the receptacle, means for holding a disk and for forcing the peripheral edge of said disk into the sides of said receptacle during the wrapping of said sides on the mandrel, in combination with means for displacing said disk holding means and removing the receptacle from said mandrel.

62. A machine for the manufacture of receptacles comprising sides and an end closure, said machine comprising a mandrel upon which is rolled a sheet of paper to form said sides, means for holding a disk adjacent to said mandrel and means located in juxtaposition to said mandrel for holding said sheet of paper thereto, a groove located in said latter means whereby said disk will form an annular recess in said sides of the receptacle for holding the end closure therein, in combination with means for displacing said disk holding means and removing the receptacle from the mandrel.

63. A machine for manufacturing paper receptacles comprising sides and a bottom, said machine comprising a mandrel upon which is rolled a sheet of paper to form said sides, in combination with a disk located in said mandrel to form said bottom, a die plate upon which said sheet of paper is placed and over which said mandrel is advanced, a pasting mechanism carried by said machine and adapted to paste said paper, a groove located in said die plate and in the path of travel of said disk whereby an annular recess is formed in the sides of said receptacle by and for the reception of said disk.

64. A machine for the manufacture of paper receptacles comprising sides and an end closure, said machine comprising a mandrel adapted to receive a disk of which is formed the said end closure, said disk extending beyond the surface of said mandrel, said mandrel adapted to roll a sheet of paper to form the sides of said receptacle at the same time causing the edge of said disk to roll into the sides of said receptacle and form an annular recess for the reception of said disk, in combination with means for removing the receptacle from the mandrel.

65. A machine for the manufacture of paper receptacles comprising sides and a bottom, said machine comprising an arm pivotally attached to a portion of said machine, a mandrel revolubly mounted on said arm for rolling a sheet of paper into a tubular form, a pasting mechanism adapted to supply said sheet of paper with adhesive material, and means in said machine acting in combination with a cam for bringing said pasting mechanism into action.

66. In a machine for the manufacture of paper receptacles, the combination of a mandrel adapted to roll a sheet of paper into a tubular form, with a pasting mechanism adapted to supply adhesive material to said paper, said pasting mechanism comprising a paste receptacle and a paste roller and means located in said machine for positively rotating said paste roller prior to and subsequent to the contact of said roller with the face of said paper.

67. A machine for the manufacture of paper receptacles comprising a mandrel adapted to roll a sheet of paper into a tubular form with a bead near one edge thereof, means for holding a paper disk and means for rolling the peripheral edge of said disk into said sheet of paper so as to form a recess therein for the reception and retention of said disk, all for the purpose set forth.

68. A machine for the manufacture of paper receptacles comprising a mandrel adapted to roll a sheet of paper into a tubular form in combination with means for holding a disk of paper, said means comprising two cooperating members one concave and the other convex and both of slightly smaller periphery than the disk and adapted to clamp the disk between them and hold said disk in centered position, means for rolling the peripheral edge of said disk into the surface of said sheet of paper thereby forming a recess in said sheet of paper for the reception and retention of said disk for the purpose set forth.

69. A machine for the manufacture of receptacles comprising means for rolling a sheet of paper into the form of the sides of a container and means for forcing the peripheral edge of a disk into the surface of said sides during such rolling in combination with means for removing the container from said mandrel.

70. A machine for the manufacture of receptacles comprising means for rolling a sheet of paper into the form of the sides of the receptacle, means for forcing the peripheral edge of a disk of paper into the surface of said sides during such rolling for the purpose of holding said disk therein and means for adhering the adjacent sheets of paper, in combination with means for removing the receptacle from the mandrel.

71. A machine for the manufacture of paper receptacles comprising a standard, an arm attached to said standard and adapted to be swung therefrom, a bearing attached to said arm and a mandrel revolubly mounted thereon, a clamp adapted to coact with the free end of said mandrel to hold a bottom disk between them and means for engaging and disengaging said clamp with and from said mandrel respectively, a die plate upon which said mandrel travels, and gearing for revolving the mandrel.

72. A machine for the manufacture of paper receptacles comprising a mandrel, a clamp adapted to coact with the free end of said mandrel and means for engaging and disengaging said clamp with and from said mandrel respectively, means for feeding a disk of paper between the mandrel and clamp, supporting means for holding a sheet of paper against said mandrel, a gear wheel connected with said mandrel and adapted to engage corresponding gear teeth, and a shaft attached to said clamp.

73. A machine for the manufacture of paper receptacles comprising a standard, an arm attached to said standard and adapted to be swung therefrom, a bearing attached to said arm and a mandrel revolubly mounted thereon, in combination with an arcuate platen coacting with the side surface of the mandrel and a clamping plate supported independently of the mandrel and separable therefrom but adapted to coact with the end of the mandrel.

74. A machine for the manufacture of paper receptacles comprising a standard, an arm attached to said standard and adapted to be swung therefrom, a bearing pivotally attached to said arm, a mandrel revolubly mounted thereon and a clamp separate from the mandrel and adapted to engage the free end of said mandrel, and a shaft located beyond the free end of the mandrel and slidably mounted in a bearing and adapted to operate said clamp.

75. A machine for the manufacture of paper receptacles comprising a standard, an arm attached to said standard and adapted to be swung therefrom, a bearing pivotally attached to said arm, a mandrel revolubly mounted thereon and a clamp adapted to engage the free end of said mandrel in combination with a pasting mechanism carried by said arm, said pasting mechanism slidably mounted on a vertical guide and comprising a paste can and a roller revolubly mounted therein, and means for keeping said pasting mechanism normally out of contact with the paper stock of which a receptacle is formed by said machine.

76. A machine for the manufacture of paper receptacles comprising a standard, an arm attached to said standard and adapted to be swung therefrom, a bearing attached to said arm and a mandrel revolubly mounted on said bearing, a clamp adapted to engage the free end of said mandrel, said clamp attached to a shaft slidably mounted in a bearing, in combination with a pasting mechanism adapted to be normally out of engagement with the paper stock of which a receptacle is manufactured by said machine and means in said machine for predeterminably forcing said pasting mechanism into contact with said paper stock for the purpose set forth.

77. In a machine for the manufacture of paper receptacles, the combination of a traveling mandrel, a bearing therefor at one end of the mandrel, an axially aligned clamp free from the mandrel but traveling with it and adapted to coact with the other end of the mandrel to grip a bottom disk between it and the mandrel, means for urging the clamp toward the mandrel, means for moving the clamp away from the same, and means for causing a sheet of paper to be wrapped around the mandrel.

78. A machine for the manufacture of paper receptacles comprising a conical mandrel rotating on its axis and traveling about a center, means for clamping a disk against one end of the mandrel to form an enclosure for the receptacle, whereby such closure may be positioned during the forming of the article, and an arcuate platen with which the mandrel cooperates in its travel and which has spaced shoulders straddling the periphery of the disk.

79. A machine for the manufacture of paper receptacles comprising a mandrel having a concave end portion, a clamp having a complementary surface and adapted to grip a disk between it and the mandrel crowning the disk inwardly of the receptacle and holding the disk with its periphery projecting past the mandrel, means for causing a sheet of paper to be wrapped around the mandrel and for depressing the paper at either side of the disk.

80. A machine for the manufacture of paper receptacles comprising a mandrel having a concave end, a separate clamp having a convex end complementary to the mandrel end and carried independently of the mandrel, means for pressing the clamp and mandrel together to clamp a disk between them, and means for wrapping a sheet about said mandrel and simultaneously forcing the edge of said disk into said sheet.

81. A machine for the manufacture of paper receptacles comprising a mandrel having a concave end, a separate clamp having a convex end complementary to the mandrel end and carried independently of the mandrel, means for pressing the clamp and mandrel together to clamp a disk between them, and means for rolling the mandrel and clamp and interposed disk upon a sheet of paper, and wrapping the sheet into a form with the edge of the disk embedding itself into the surface of said sheet.

82. A machine for the manufacture of paper receptacles comprising a conical mandrel having a concave end, a separate clamp having a convex end complementary to the mandrel end and carried independently of the mandrel by means on the opposite side of the clamp, said clamp having a circular edge, means for pressing the clamp and mandrel together to clamp a disk between them, with its edge projecting, an arcuate platen adapted to support a strip of paper and having an arcuate groove, and means for rolling the mandrel, the clamp and the interposed disk upon a sheet of paper on the platen, thereby wrapping the sheet into a conical form with the edge of the disk embedded therein and correspondingly bowing outwardly an annular region of the conical wall.

83. A machine for the manufacture of paper containers comprising means for rolling a sheet of paper into the form of the sides of a container, means for forcing a groove in the container, means for forcing a groove in said sides and means for locating a disk of paper in said groove during the rolling of said sides in combination with means for removing the container from the machine when completed.

84. In a machine for making paper receptacles, the combination of a mandrel, a platen co-acting with said mandrel, the mandrel having a clamping member for securing a bottom disk thereto, a magazine for bottom disks, means for feeding the disks, one at a time to a position between said mandrel and said clamping member and means for causing said clamping member to hold said disk against the end of said mandrel with the edge of said disk projecting beyond the surface of said mandrel while the body of the receptacle is being rolled.

Signed at Cleveland in the county of Cuyahoga and State of Ohio this 15th day of August, 1922.

DAVID J. JENNINGS.

Witnesses:
 ALBERT B. DONNELLY,
 MARTHA E. DONNELLY.